United States Patent
Brockman et al.

[11] Patent Number: 6,125,356
[45] Date of Patent: Sep. 26, 2000

[54] PORTABLE SALES PRESENTATION SYSTEM WITH SELECTIVE SCRIPTED SELLER PROMPTS

[75] Inventors: Robert T. Brockman, Houston, Tex.; Donald D. Jones, Smiths, Bermuda

[73] Assignee: Rosefaire Development, Ltd., Hamilton, Bermuda

[21] Appl. No.: 08/929,929

[22] Filed: Sep. 15, 1997

Related U.S. Application Data

[63] Continuation-in-part of application No. 08/587,276, Jan. 18, 1996, Pat. No. 5,826,240.

[51] Int. Cl.⁷ .................................................. G01R 13/00
[52] U.S. Cl. ................... 705/37; 705/26; 705/39
[58] Field of Search .................... 705/37, 7, 26, 705/39

[56] References Cited

U.S. PATENT DOCUMENTS

| | | | |
|---|---|---|---|
| 4,415,065 | 11/1983 | Sandstedt | 186/39 |
| 4,530,067 | 7/1985 | Dorr | 364/900 |
| 4,569,421 | 2/1986 | Sandstedt | 186/39 |
| 5,038,284 | 8/1991 | Kramer | 364/408 |
| 5,053,956 | 10/1991 | Donald et al. | 364/401 |
| 5,239,462 | 8/1993 | Jones et al. | 364/408 |
| 5,309,355 | 5/1994 | Lockwood | 364/401 |
| 5,317,503 | 5/1994 | Inoue | 364/400 |
| 5,349,678 | 9/1994 | Morris et al. | 395/800 |
| 5,351,186 | 9/1994 | Bullock et al. | 364/401 |
| 5,367,627 | 11/1994 | Johnson | 395/161 |
| 5,386,555 | 1/1995 | Kuroda et al. | 395/600 |
| 5,434,394 | 7/1995 | Roach et al. | 235/375 |
| 5,481,647 | 1/1996 | Brody et al. | 395/51 |
| 5,493,490 | 2/1996 | Johnson . | |
| 5,576,951 | 11/1996 | Lockwood . | |
| 5,584,025 | 12/1996 | Keithley et al. | 395/615 |
| 5,592,375 | 1/1997 | Salmon et al. | 705/7 |
| 5,598,487 | 1/1997 | Hacker et al. | 382/313 |
| 5,664,115 | 9/1997 | Fraser | 705/37 |

FOREIGN PATENT DOCUMENTS 0 514 231 A2 11/1992 European Pat. Off. ........ G06F 15/21
WO 97/26610 7/1997 WIPO .

OTHER PUBLICATIONS

Campanelli, "Sound the Alarm!," Sales & Marketing Management, vol. suppl. issue, pt. 2, pp. 20–22 and 24–25, Dec. 1994.

Cardone Group, Electronic Coach videotape (Date Unknown).

Chappell, "Carmakers try to make buying simple," Automotive News, Crain Communications Inc., vol. 67, Issue 5483, pp. 3, 42, Dialog File copy 3 pages (1993).

Chappell, "Small Computers Help Sellers Close Deals, Gather Vital Data," Automotive News, Crain Communications Inc., May 27, 1996, News section, p. 16 (1996).

(List continued on next page.)

*Primary Examiner*—Thomas R. Peeso
*Attorney, Agent, or Firm*—Arnold, White & Durkee

[57] ABSTRACT

A handheld computer unit for use by, e.g., a car sales person (seller) prompts the seller with a standard script to be followed at each step in the process after a prospect enters a dealership. The prospect's response to the scripted questions is used to identify the prospect's particular interests of a general nature, e.g., safety, and of a specific nature, e.g., trailer towing capacity. When either a general or specific interest is identified, the seller is prompted to tailor the conversation to address the prospect's interests. Among other things, the handheld unit can perform functions such as (i) permitting the seller to retrieve useful information such as inventory availability from a sales information data store; (ii) displaying option-sensitive prompts to aid the seller in discussing specific vehicles under consideration; (iii) accessing remote communications links to external data sources to obtain information on credit-worthiness of the prospect, financing terms, and availability; (iv) displaying motivational information such as the percentage likelihood of consummating the sale successfully; (v) providing a communications link with management personnel.

47 Claims, 70 Drawing Sheets

OTHER PUBLICATIONS

Christeson, "The trainer's role in sales automation," Training & Development, Information Access Co., a division of Ziff Communications Co.; American Society for Training and Development Inc., vol. 46, No. 12, p. 67 (1992).

Dryden, "Mobile LAN Streamlines Service," CommunicationsWeek,CMP Publications, Inc., Aug. 29, 1994, Local Area Networks section, p. 19 (1994).

Fillon, "Keep on trucking Yellow Freight trucking; Road Warrior: A Sales Automation Supplement," (company profile), ASAP, Sales & Marketing Management, Information Access Company, a Thomson Corporation Company; Bill Communications Inc., vol. 147, No. 6, p. S17 (1995).

International Search Report dated Jul. 28, 1997 for International Application No. PCT/IB97/00267.

McKee, "How 'the good old days' relate to business–to–consumertelemarketing scripts," Telemarketing,Information Access Co., a division of Ziff Communications Co.; Technology Marketing Corporation, vol. 11, No. 11, p. 27 (1993).

Orlin, "Selling in teams," (cover story), Training and Development, Information Access Co., a division of Ziff Communications Co.; American Society for Training and Development Inc., vol. 47, No. 12, p. 26 (1993).

Radding, "Software Helps Sales Representatives, Managers Make Cross–Selling a Reality; Automation for Relationship Banking," The Magazine of Bank Management (formerly Bank Administration Magazine), Bank Administration Institute, Oct., 1990, Management Software section, p. 78 (1990).

Schroeder et al., "Training salespeople on high–tech notebook computers," Training and Development, Information Access Co., a division of Ziff Communications Co.; American Society for Training and Development Inc., vol. 46, No. 12, p. 60 (1992).

Tucker, "Portable Computers 3; Higher–value sales," The Financial Times Limited, Financial Times, Feb. 8, 1991, Survey section, p. III (1991).

Younger, "Sales savvy for the nineties; Four by Four," Training & Development, Information Access Co., a division of Ziff CommunicationsCo.; American Society for Training and Development Inc., vol. 46, No. 12, p. 13 (1992).

[Anonymous], "Controlling the Showroom," Automotive News, Crain Communications Inc., Issue 5313, p.E20, ProQuest Periodical Abstracts,2 pgs. (1989).

[No author listed], "Twelve years of innovation; Foodservice Distribution: The Evolution of an Industry," ASAP, Information Access Company, a Thomson Corporation Company; Bill Communications Inc. (Institutional Distribution), vol. 21, p. 279 (1985).

[No author listed], "Solectek AIRLAN wireless products selected for use in automated auto service system," Business Wire, Business Wire, Inc., Aug. 1, 1994.

"Sound the Alarm" by M. Campanelli, Sales And Marketing Management, no. Part 02, Dec. 94, pp. 20–22, 24/25.

FIG. 3

Sales Manager

[Show script] [Close prosp]     [Manager] [X]

*GRT | WAN | SEL | PRO | DEN | TRA | SER | WRI | CBI | SOL | DLR | DEL

- Name: OLSEN, CATHERINE    Driver lic: 102654852    SSN:
- Nickname: CATHY
- Age: 25-39    Birthday: 1/1/1961    Homeowner: Yes    State: TX
- Internet address:
- Spouse name: MIKE    Birthday:    Class: Woman
- Hobbies: BOATING, CAMPING, GARDENING    Referred by:    Spouse SSN:
- Children: MIKEY    10
- Trade: YES    2A/2N    #PASS:
- Note: WON'T MAKE DECISION WITHOUT SPUSE Prospect info \ Prospect personal data \ Co-buyer data \ Prospect wants \ Trade-in \ Trade-in appraisal \ Vehicle search WAN 0:32 | 6:53 | 412496 Miss Catherine "Cathy" Olsen    PER

FIG. 4

| Sales Manager | | | | | | | | | | | | X |
|---|---|---|---|---|---|---|---|---|---|---|---|---|
| Show script | Show script | | | | | | | | | | Manager | |
| *GRT | WAN | SEL | PRO | DEN | TRA | SER | WRI | CBI | SOL | DLR | DEL | |

Name OLSEN, MIKE    Title Mr    SSN

Address 12334 KIOWA RIVER

City MISSOURI CITY    State TX   Zip 77459

County FORT BEND    Country United States

Phones Home (713)660-7385   Work    Extension

Employer

Occupation    State    Birthday

Dirver lic.

Prospect info \ Prospect personal data \ Co-buyer data \ Prospect wants \ Trade-in \ Trade-in appraisal \ Vehicle search WAN 0:32 | 8:04 | 412496 Miss Catherine "Cathy" Olsen

| Sales Manager | | | | | | | | | | | |
|---|---|---|---|---|---|---|---|---|---|---|---|
| Show script | Close prosp | | | | | | | | | Manager | X |
| *GRT | WAN | SEL | PRO | DEN | TRA | SER | WRI | CBI | SOL | DLR | DEL |

New/Used [New]　　Low year [1997]　High year [1997]　　Car/Truck [Car]

Make [FORD]　　[　　]　　[　　]　　Transmission [　]　　Air cond. [　]

Series [　　]　　[　　]　　[　　]　　Engine [　]　　No. of cyl. [　]

Model # [　　]　　　　　　　　　　　　Fuel type [　]

Vehicle Type — Seating capacity — Body —　　Principal driver [　]　　Age [　]
☐ Car　　☐ 2　☐ 7　　☐ 2 door　　Mileage/year [20,000]　Business [　]
☐ Sport Utility　☐ 4　☐ 8　　☐ 3 door　　Budget/month [500]　　Downpmt [1200]
☐ Truck　☐ 5　☐ 12　　☐ 4 door　　WANTS 1 [CD]
☐ Van　　☐ 6　　　　　☐ Convertible　WANTS 2 [LEATHER]

Class —　　　Group —　　　Drive —　　　WANTS 2 [ABS]
☐ Luxury　　☐ Full size　☐ FWD
☐ Sport　　☐ Mid size　☐ RWD
☐ Standard　☐ Small　　☐ AWD
　　　　　　　　　　　　☐ 4WD

| Prospect info | Prospect personal data | Co-buyes data | Prospect wants | Trade-in | Trade-in appraisal | Vehicle search | S | WAN |
|---|---|---|---|---|---|---|---|---|
| WAN 0:32 | 10:31 | 412496 Miss Catherine "Cathy" Olsen | | | | | ▽ | ▽ |

FIG.7

| Sales Manager | | | | | | | | | | | | X |
|---|---|---|---|---|---|---|---|---|---|---|---|---|
| Show script | Close prosp | | | | | | | | | | Manager | |
| *GRT | WAN | SEL | PRO | DEN | TRA | SER | WRI | CBI | SOL | DLR | DEL | |

Print trade-in appraisal at station [ ]

Verbal request for trade appraisal made to [THOMPSON]

[Print]

| Prospect info | Prospect personal data | Co-buyes data | Prospect wants | Trade-in | Trade-in appraisal | Vehicle search | | APP |
|---|---|---|---|---|---|---|---|---|
| WAN 0:32 | 21:24 | 412496 Miss Catherine "Cathy" Olsen | | | | | ▽△ | |

FIG. 8

Sales Manager — Close prosp — Manager [X]

*GRT | WAN | SEL | PRO | DEN | TRA | SER | WRI | CBI | SOL | DLR | DEL

Attributes and Price/Payment | Options

New/Used: New
Low year: 1997
High year: 1997
Make: FORD
Make: MUSTANG
Series:
Body:

Vehicle Type
☐ Car
☐ Sport Utility
☐ Truck
☐ Van

Seating capacity
☐ 2  ☐ 7
☐ 4  ☐ 8
☐ 5  ☐ 12
☐ 6

Body
☐ 2 door
☐ 3 door
☐ 4 door
☐ Convertible

Class
☐ Luxury
☐ Sport
☐ Standard

Group
☐ Full size
☐ Mid size
☐ Small

Drive
☐ FWD
☐ RWD
☐ AWD
☐ 4WD

Payment from [500] to [500]   Tier [A]
List price from [ ] to [ ]

[Search]  [Clear screen]

Prospect info \ Prospect personal data \ Co-buyes data \ Prospect wants \ Trade-in \ Trade-in appraisal \ Vehicle search [S] SEL [△▽]

WAN 0:32 | 22:33 | 412496 Miss Catherine "Cathy" Olsen

```
Vehicles found
00031456    97 FORD    MUSTANG    2DR CNV              1FALP4443VF201267  R
00031705    97 FORD    MUSTANG    2DR CNV              1FALP4448VF208280  R
CJB00011    97 FORD    MUSTANG    2DR CPE    GT        1FALP42X0VF120241  F
CJB00010    97 FORD    MUSTANG    2DR CPE    GT        1FALP42X4VF116208  F
```

Vehicle: New 1997 FORD MUSTANG 2DR CNV 3 P44
  List: 23590    Calc: 23945    Cost:           Calc: 21752       Acct: 100
  Mileage: 12    Spi#:          GVW:            Whbse: 101.3
  Color: RIO RED TINTED CLEARCOAT          Trim: SADDLE CLOTH BUCKETS
  Engine: ENGINE-3.8L EFI V6               Trans: AUTO OVERDRIVE TRANSMISSION
  Status: (R) READY TO SELL       In stock: 2         Location: FORD SALES
  Package: 243A   Options: 572 63A 143 217 132 994 44U M 12H 20A

[ Select vehicle ]    [ More ]                          [ Cancel ]

Sales Manager — Manager [X]

Show script | Close prosp

*GRT | WAN | SEL | PRO | DEN | TRA | SER | WRI | CBI | SOL | DLR | DEL

Description 1997 FORD    MUSTANG         2DR CNV    ED

Stock number 00031456  VIN 1FALP4443VF201267

List   23945   Price   23000

Hold for salesman

Co-buyes data \ Prospect wants \ Trade-in \ Trade-in appraisal \ Vehicle search \ Selected vehicle \ Credit Bureau Inquiry \ P \

WAN 0:32 | 4:44 | 412496 Miss Catherine Olsen                              VEH

| Speed Control | Next | Previous | More? | Interior |

For relaxed highway cruising, this vehicle has Speed Control with convenient steering wheel-mounted controls.

FIG. 18

| Speed Control | Next | Previous | More? |
| --- | --- | --- | --- |
| | | | Interior |

This is how it works:
- Press the ON switch and press SET ACCEL at the desired speed.
- To speed up, press and hold SET ACCEL. To slow down, press COAST.
- Touching the brake pedal returns the car to foot control.

FIG. 19

Sales Manager

Show script

*Name: OLSEN, CATHERINE

Phones  Home (713)660-7385  Work (800)999-6348  Extension 102

Beback date ___  Time ___

*Tickle date 9/3/1997  Disposition ___

*Prospect type First time  *Advertising source SERVC CUST

*Up ___

\* These are the minimum required fields necessary to close the prospect and return to the Main menu.

Manager

Main Menu

Cancel

WAN 0:05 | 38:10 | 412496 Miss Catherine "Cathy" Olsen  BEB

FIG. 20

Welcome to ABC Motors, How may i assist you today?

[Top] [Previous]

[We need a new car] [We're just looking] [How much is this car]

FIG. 21

PRINT TST002                                  PRINT 415 RECORDS - REPORT 022                            RUN 09/10/97  15:35:40  PAGE   1

| STEP SEQ | SCRIPT TEXT | ANSWER | GOTO | PUT DATA | IN FIELD | STEP SEQ |
|---|---|---|---|---|---|---|
| CBI 0010 | Let's get you started on the credit application. Fill in all of the lines on both sides of the page. When you are done, you and I will go over it to make sure it is complete. | Continue | | | | CBI 0020 |
| CBI 0020 | While you're filling that out, I'll need to see your driver's license and I need your social security number. | Continue | | | | CBI 0030 |
| CBI 0030 | Enter Social Security number: | Continue | | | BUYERSSN | CBI 0040 |
| CBI 0040 | Enter Driver's license number: | Continue | | TX | DRIVERSLICST DRIVERSLICNO | CBI 0050 |
| CBI 0050 | Enter Driver's license state: | Continue | | | DRIVERSLICST | CBI 0060 |
| CBI 0060 | Enter Address. Is it correct on the license? | Continue | | | BUYERADDR1 | CBI 0070 |
| CBI 0070 | Enter Zip Code. Is is correct on the license? | Continue | | | BUYERZIP | CBI 0080 |
| CBI 0080 | That'll do it. Let's review the credit application, and then I'll take it to the Business Manager. | Continue | | | | CBI 9999 |

FIG. 22

CLNT TST002. PRINT 415 RECORDS - REPORT 022 RUN 09/10/97 15:35:40 PAGE= 3

| STEP SEQ | SCRIPT TEXT | ANSWER | GOTO | PUT DATA | IN FIELD | STEP SEQ |
|---|---|---|---|---|---|---|
| DEL 0010 | When the business manager has finished with your customers, you will receive a page asking you to come to his office. Take your customers to your office and complete the delivery process. Review contents of the New Vehicle Packet. | Continue | | | | DEL 0020 |
| DEL 0020 | • Show your customer where the service write-up area is.<br>• Introduce your customer to a Service Advisor.<br>• Give him/her the scheduled maintenance book.<br>• Remind him/her of the three free LOF in the front of the book. | Continue | | | | DEL 0025 |
| DEL 0025 | Before introducing the Service Advisor, say:<br>You will be assigned your own personal service advisor. This means that they get to know your vehicles, and they ensure that you are completely satisfied on every visit. | Continue | | | | DEL 0030 |
| DEL 0030 | Tell the customer how convenient service's hours are:<br>Our Service Department is convenient for both pick-up and drop-off customers. Service is open from 7:30am to 7:30pm, Monday through Friday, and by appointment on Saturday. | Continue | | | | DEL 0040 |
| DEL 0040 | Inspect the vehicle while filling out and reviewing the Ford Quality Commitment Delivery Checklist. Now say:<br>In approximately two to three weeks you will receive a survey like this one from Ford Motor Company. The survey will ask you questions concerning your sales experience at ABC Motors. | Continue | | | | DEL 0050 |
| DEL 0050 | We take pride in our customer satisfaction rating. Your COMPLETE satisfaction is our Number 1 goal. Entrance into Ford's Elite Masters Sales Program and part of my compensation is determined by your rating of "2A", which rates your overall purchase/lease experience. | Continue | | | | DEL 0060 |
| DEL 0060 | and "2N", which rates the overall condition of your vehicle at time of delivery. Do you feel you can rate both those areas as | TEN<br>LESS THAN 10 | | 10<br><10 | BUYERMISC2<br>BUYERMISC2 | DEL 0070<br>DEL 0080 |

FIG. 23

```
                   completely satisfied?
      ----  ----  -----------------------------------------------  ---------------------  ----  ----
      DEL  0070  Turn the Quality Commitment Performance Checklist so they  Continue              DEL  0100
                   can see it, and say:
                   Great, I'll make a note of that.
      ----  ----  -----------------------------------------------  ---------------------  ----  ----
      DEL  0080  What can I do to correct the issue NOW, TODAY?    Continue              DEL  0090
                   Listen carefully to what your customer has to say. Take
                   notes if necessary so he'll know you are paying attention.
                                                                   LASTNOTE
      ----  ----  -----------------------------------------------  ---------------------  ----  ----
      DEL  0090  Good responses to issues raised at delivery are:   Continue - Cust OK    DEL  0091
                   - Let's get the GM, I know he'll want to hear about this.  Talk to GM  DEL  0092
```

FIG. 24

| STEP SEQ | SCRIPT TEXT | ANSWER | GOTO | PUT DATA | IN FIELD | STEP SEQ |
|---|---|---|---|---|---|---|
| | - Let's take it back to service and have them look at it now. | Go to Service | | | | DEL 0093 |
| | - I apologize, I didn't realize you felt this way. What can I do to right this situation? Would it help to speak to the Dealer or the General Manager? | Talk to Dealer | | | | DEL 0094 |
| DEL 0093 | Well, if you think of anything more you think I can do to improve your satisfaction, please CALL me. | Continue | | | | DEL 0095 |
| DEL 0094 | Let's go find the GM for you right now and we'll get this right for you. | Continue | | | | DEL 0095 |
| DEL 0093 | Let's go back to SERVICE right now and we'll get it corrected. | Continue | | | | DEL 0095 |
| DEL 0094 | Let's go find the DEALER for you right now and we'll get this right for you. | Continue | | | | DEL 0095 |
| DEL 0095 | Well, I'm glad we straightened that out. I have one more question for you.... | Continue | | | | DEL 0100 |
| DEL 0100 | Will you help me increase my business by giving me just one REFERRAL? | Yes | | | | DEL 0110 |
| | | Nobody | | | | DEL 0120 |
| DEL 0110 | Enter information in your notes in front of the customer. Thank you, I appreciate this. | Continue | | | LASTNOTE | DEL 0125 |
| DEL 0120 | You are going to get a lot of attention in the next few days from your friends, neighbors, and co-workers with your new vehicle. If one of them expresses interest in buying a new vehicle, will you give them my card and recommend they call me? Here's an extra business card. | Continue | | | | DEL 0125 |
| DEL 0125 | And if they come in and end up buying a new or used vehicle, I'll give you a $25 coupon for The Macaroni Grill to show my appreciation. | Continue | | | | DEL 0130 |

FIG. 25

| DEL 0130 | THANK YOU for choosing to buy your vehicle from ABC Motors. I hope this is only the beginning of our business relationship. | Continue | DEL 0140 |
|---|---|---|---|
| DEL 0140 | I'll call you in a few days to see if you have any questions about your new vehicle and to see how you like your new vehicle. | Continue | DEL 0150 |
| DEL 0150 | Note: Congratulations on making the sale! Hit CONTINUE and then CLOSE PROSPECT to begin your next sale. | Continue BEB | DEL 9999 |

| | | | |
|---|---|---|---|
| | become a little more familiar with this vehicle. | | |
| DEM 0170 | Not Ready:<br>* I understand how you feel.<br>* I once felt that way myself when I first began to search for a new car.<br>* But I found that by driving each vehicle that interested me, I was better able to define what I did and didn't like and it actually made my search easier. | OK<br>Really, not ready | DEM 0200<br>DEM 0190 |
| DEM 0180 | Not buying today: That's fine. Let me show you the comfortable ride this vehicle offers. No one can make you buy a vehicle just for test driving it. | OK<br>No | DEM 0200<br>DEM 0190 |

FIG. 28

PRINT 415 RECORDS - REPORT 022                    RUN 09/10/97 15:35:40   PAGE= 6

CLNT TST002

| STEP SEQ | SCRIPT TEXT | ANSWER | GOTO PUT DATA | IN FIELD | STEP SEQ |
|---|---|---|---|---|---|
| DEM 0190 | Well let's make an appointment for you to come in and spend a little time in this vehicle. Are you free tonight? How about tomorrow evening? Which is best for you? | OK<br>No | | | DEM 0191<br>DEM 1020 |
| DEM 0191 | Would 7 or 7:15 be more convenient for you? Le me mark it in my schedule here. | Continue | | APPTDATE | DEM 0195 |
| DEM 0195 | Now, you will call me if something changes on your end, won't you? And I'll do the same for you if something changes on my end. Where can I reach you -or- your answering machine? | Home Phone<br>Work Phone<br>Cell Phone<br>No Phone Given | | APPTTIME | DEM 0196<br>DEM 0197<br>DEM 0198<br>DEM 0199 |
| DEM 0196 | Home phone: | Continue<br>Work# also given | | BUYERHOMEPH | DEM 0199<br>DEM 0197 |
| DEM 0197 | Work phone: | Continue<br>Cell# also given | | BUYERWORKPH | DEM 0199<br>DEM 0198 |
| DEM 0198 | Cell phone: | Continue<br>Home# also given | | | DEM 0199<br>DEM 0196 |
| DEM 0199 | Great, I'll see you then. | Continue | BEB | | DEM 9999 |
| DEM 0200 | Note: When on the demo ride, be sure to let all drivers take a turn behind the wheel.<br>Sit in the back if there is another driver in the group. He or she will enjoy the ride more in the passenger seat. | Continue | | | DEM 0210 |
| DEM 0210 | I think you'll find you'll like how this vehicle rides. We'll take it on the highway if you like.<br>First take a right onto the feeder and then take another right at the first street you see. | Tell DLR story 1 | | | DEM 0220 |

FIG. 29

| | | | |
|---|---|---|---|
| DEM 0220 | See these trees on the edge of the lot? Mr. Jones planted those when he built this dealership back in 1955. We have a picture of the trees were. It's hard to believe you can see how small the trees were. It's hard to believe we've been servicing people here at ABC Motors for over 40 years. Remind me to show you the picture when we get back. | Continue | DEM 0230 |
| DEM 0230 | What made you decide to look at this vehicle? | PER | LASTNOTE | DEM 0240 |
| DEM 0240 | Note: On the demo drive, point out features the prospect has shown an interest in during the product presentation. | Continue | DEM 0250 |

FIG. 30

| CINT TST002 | | PRINT 415 RECORDS - REPORT 022 | | RUN 09/10/97 15:35:40 | PAGE= 7 |
|---|---|---|---|---|---|
| STEP SEQ | SCRIPT TEXT | ANSWER | GOTO PUT DATA IN FIELD | STEP SEQ | |
| | NOTE the three items the prospect stated he really WANTS in a vehicle are displayed behind this script. Try to get the prospect to give a YES response to your questions, which VALIDATES that the vehicle does meet their wants. | | WAN | | |
| DEM 0250 | This vehicle sure has great response, doesn't it? The stereo system in this vehicle sure sounds good, doesn't it? | Yes<br>No<br>Continue | | DEM 0260<br>DEM 0300<br>DEM 0310 | |
| DEM 0260 | Notice the leg room, and there's still plenty of room in the back. You'll be able to fit your family or friends in here comfortably, right? | Yes<br>No<br>Continue | | DEM 0310<br>DEM 0300<br>DEM 0310 | |
| DEM 0300 | Responses to NO answers are:<br>- Why do you say that?<br>- Would you elaborate?<br>- I understand.<br>- Or, just move on to the next question without responding. | Continue | | DEM 0310 | |
| DEM 0310 | Where is the first place you would take you new vehicle? Who is the first person you would take for a drive in your new vehicle? | Continue | | DEM 0320 | |
| DEM 0320 | We have a shuttle for our service customers. Do you live or work close by? | Yes<br>No | | DEM 0330<br>DEM 0340 | |
| DEM 0330 | Great, then you will be sure to take advantage of the three FREE Lube, Oil, and Filter changes we include at no extra charge with the sale of every vehicle. | Continue | | DEM 0350 | |
| DEM 0340 | Well, I'm sure you will still want to make it in for the three FREE Lube, Oil, and Filter changes we include at no extra charge with the sale of every vehicle. | Continue | | DEM 0350 | |

FIG. 31

| CLNT TST002 | PRINT 415 RECORDS - REPORT 022 | | | RUN 09/10/97 15:35:40 | PAGE= 8 |
|---|---|---|---|---|---|
| STEP SEQ | SCRIPT TEXT | ANSWER | GOTO PUT DATA | IN FIELD | STEP SEQ |
| GRT 0050 | Welcome to ABC Motors. How may I assist you today? | We need a new car<br>We're just looking<br>How much is this c | | | GRT 0300<br>GRT 0300<br>GRT 0100 |
| GRT 0100 | I'll be happy to get you a price on a car. So, is this the car you've decided to buy? | Yes - the exact on<br>No/Undecided<br>At the right price | | | GRT 0110<br>GRT 0120<br>GRT 0125 |
| GRT 0110 | Great, have you already had a chance to test drive it? | Yes - here<br>Yes - elsewhere<br>No | B | PROSPTYPE | GRT 0130<br>GRT 0305<br>GRT 0120 |
| GRT 0120 | Well, then let's make sure it's the right car before we price it for you. Because if it's not the car you want, then it doesn't matter what the price is, right? | OK<br>Just need a price | | | GRT 0300<br>GRT 0200 |
| GRT 0125 | Well, then let's make sure it's the right car before we price it for you. Because if it's not the car you want, then it doesn't matter how great the price is, right? | OK<br>Just need a price | | | GRT 0300<br>GRT 0200 |
| GRT 0130 | Great, welcome back. So you've already had a chance to do some shopping. | Continue | | | GRT 1300 |
| GRT 0200 | Okay, follow me to get a price on this vehicle. I'll introduce you to our sales manager, who will be able to give you a price. | Continue | | | GRT 1300 |
| GRT 0300 | Great, is this your first visit to ABC Motors? | Yes - First<br>No - Serviced here<br>No - Bought here<br>No - Shopped here | F<br>F<br>F<br>B<br>SC<br>2B | PROSPTYPE<br>PROSPTYPE<br>PROSPTYPE<br>PROSPTYPE<br>SOURCECODE<br>SOURCECODE | GRT 0310<br>GRT 0320<br>GRT 0320<br>GRT 0320 |
| GRT 0305 | And is this your first visit to ABC Motors? | Yes - First<br>No - Serviced here<br>No - Bought here<br>No - Shopped here | F<br>F<br>F<br>B | PROSPTYPE<br>PROSPTYPE<br>PROSPTYPE<br>PROSPTYPE | GRT 1300<br>GRT 0325<br>GRT 0325<br>GRT 0325 |

FIG. 32

| | | SC 2B | SOURCECODE SOURCECODE | |
|---|---|---|---|---|
| GRT | 0310 | Let me explain our layout for you. New Cars are in the front. Explorers, Minivans, and New Trucks are on the side of the building. Our Pre-Owned Vehicles are displayed in the adjacent lot. | Continue | | GRT 1000 |
| GRT | 0320 | Super. Welcome back. | Continue | | GRT 1000 |
| GRT | 0325 | Welcome back. | Continue | | GRT 1300 |
| GRT | 1000 | Are you interested in a New Ford product or a | New | N | WANTNEWUSED | GRT 1300 |

FIG. 33

CLNT TST002  PRINT 415 RECORDS - REPORT 022  RUN 09/10/97 15:35:40  PAGE= 9

| STEP SEQ | SCRIPT TEXT | ANSWER | GOTO | PUT DATA | IN FIELD | STEP SEQ |
|---|---|---|---|---|---|---|
| | Pre-Owned vehicle? | Pre-Owned | | U | WANTNEWUSED | GRT 1300 |
| | | Undecided | | - | WANTNEWUSED | GRT 1300 |
| GRT 1300 | By the way, I'm.... | Continue | | | | GRT 1301 |
| GRT 1301 | What's your name?  Do you mind if I write that down? | Continue | | | BUYERNAME | GRT 1305 |
| GRT 1305 | This computer is great.  The owner, Mr. Jones, believes that every customer should be given our best treatment possible and has asked us to use it with each visitor. Is that OK with you? | OK | | | | GRT 1310 |
| GRT 1310 | Mr. Jones has also asked us to conduct a VERY SHORT SURVEY to determine which advertising sources are most effective.  Your answers are so important to us that he has asked us to log every response. | Continue | | | | GRT 1320 |
| GRT 1320 | First, which advertising source listed here BEST represents the reason you chose to visit our dealership? | Continue | | | SOURCECODE | GRT 1330 |
| GRT 1330 | Second, what is your ZIP code? | Continue | | | BUYERZIP | GRT 1340 |
| GRT 1340 | Great.  THANK YOU for taking a moment to answer those two questions. | Continue | | | | GRT 1350 |
| GRT 1350 | Note: When you hit CONTINUE, this script will disappear. No more scripts will display until you:<br>1. Hit the NEW key if this is a new prospect.<br>2. Hit the SEARCH key if this person has been here before.<br>3. Hit the CANCEL key if you want to start over. | Continue | | | | GRT 9999 |

```
CLNT TST002                    PRINT 415 RECORDS - REPORT 022                    RUN 09/10/97  15:35:40    PAGE=   10

STEP SEQ  SCRIPT TEXT                                           ANSWER              GOTO  PUT DATA  IN FIELD       STEP SEQ
--------  -----------------------------------------------       ------------------  ----  --------  -------------  --------
PRO 0030  I have one more question of you. It will help me      Safety                     1        MOTIVATION01   PRO 0030
          understand your needs a little better. Which of the   Performance/Mech           1        MOTIVATION02   PRO 0030
          following items are most important to you in a vehicle? Reliability              1        MOTIVATION03   PRO 0030
                                                                Next/More Choices                                  PRO 0031
          Note: More than one answer may be selected. This screen
          will remain displayed until you hit 'NEXT/MORE'.

PRO 0031  Note: You have NINE choices. You may look through all of Interior Room           1        MOTIVATION04   PRO 0031
          the choices by using the 'Next' or 'Previous' buttons to Economy                 1        MOTIVATION05   PRO 0031
          move back and forth between the screens.              Comfort/Convenienc         1        MOTIVATION06   PRO 0031
                                                                Next/More Choices                                  PRO 0032

PRO 0032  Note: When you are done with your selections, hit 'Done'. Style                  1        MOTIVATION07   PRO 0032
          Else hit 'Previous' for more choices.                 Off-Road                   1        MOTIVATION08   PRO 0032
                                                                Snow                       1        MOTIVATION09   PRO 0032
                                                                Done                                               PRO 9999
```

```
CLNT TST002                       PRINT 415 RECORDS - REPORT 022                      RUN 09/10/97  15:35:40   PAGE=   11

STEP SEQ  SCRIPT TEXT                                        ANSWER              GOTO PUT DATA  IN FIELD        STEP SEQ  *
----      -----------                                        ------              ---- --------  --------        ---- ---  -

SEL 0010  Note: What is our next step in SELECTING a vehicle?
                                                             1. Enter Stock#                                    SEL 0020
                                                             2. Check Vehicle                                   SEL 0030
                                                             3. Vehicle Search                                  SEL 0040

1. Enter the stock number for the vehicle we've chosen.
          2. I have a vehicle in mind to show, and want to see if
             it is available.
          3. Use Vehicle Search to select a vehicle.
                                                             Continue                                           SEL 9999  Y SEL 0020  Enter the STOCK# of the vehicle. It is displayed on the
          upper right hand corner of the BAR code sticker on the
          windshield. The system will accept the STOCK# when                     SEL           UNIT1STOCKNO
          you hit CONTINUE if the vehicle is available for sale.
                                                             Continue                                           SEL 9999  Y SEL 0030  Walk over to the vehicle you have in mind, and enter
          the STOCK#. The system will accept the STOCK# if the                   SEL           UNIT1STOCKNO
          vehicle is available.
                                                             Continue                                           SEL 9999  Y SEL 0040  1. When you hit CONTINUE, the Vehicle Search screen will
             be displayed. The entries you have made regarding the
             prospect's wants should already be on the screen.                   SEL
          2. You may make further entries or you may hit SEARCH.
          3. After you select the vehicle you want, click on the
             PRO button to begin the Product Presentation.
```

FIG. 36

CLNT TST002   PRINT 415 RECORDS - REPORT 022                                    RUN 09/10/97  15:35:40  PAGE= 12

| STEP SEQ | SCRIPT TEXT | ANSWER | GOTO PUT DATA | IN FIELD | STEP SEQ |
|---|---|---|---|---|---|
| TRA 0005 | Before we go in..... | Continue | | | TRA 0010 |
| TRA 0010 | May we make you an offer on your trade-in? | Yes<br>No<br>Not Sure | YES<br>NO<br>NOT SURE | BUYERMISC1<br>BUYERMISC1<br>BUYERMISC1 | TRA 0040<br>TRA 0020<br>TRA 0020 |
| TRA 0020 | Naturally you are not required to accept our offer if you don't think it's fair, but at least you will get an idea of what DEALERS WILL PAY for your vehicle in the Houston market. Also, don't forget that applying your trade against the purchase price of the vehicle saves you money in TAXES. | Okay<br>No | | | TRA 0040<br>TRA 0030 |
| TRA 0030 | I understand your feelings. Let's get you the figures on your new car. Right this way. | Continue | | | TRA 9999 |
| TRA 0040 | Let me collect some data about your vehicle and then tell you what the Used Vehicle Buyer is going to look at when he evaluates your trade. | Continue | | | TRA 0040 |
| TRA 0050 | What is the LICENSE plate number? | Continue | TX | TRADESTATE<br>TRADELICENSE | TRA 0051 |
| TRA 0051 | What is the LICENSE STATE? | Continue | | TRADESTATE | TRA 0060 |
| TRA 0060 | What is the ODOMETER? | Continue | AT | TRADETRANS<br>TRADEMILEAGE | TRA 0070 |
| TRA 0070 | Is this an automatic? | Continue | | TRADETRANS | TRA 0080 |
| TRA 0080 | What COLOR is it? | Continue | | TRADECOLGRP | TRA 0100 |
| TRA 0100 | Enter the VIN: | Continue | | TRADEVINNUM | TRA 0110 |

FIG. 37

| | | | |
|---|---|---|---|
| TRA 0110 Ask: Do you owe anything on your trade? | Yes | | TRA 0130 |
| | No | | TRA 0140 |
| | Yes, but $$ unknown | TRADELIENBAL | TRA 0120 |
| TRA 0120 That's okay. We can get that information later. | Continue | | TRA 0130 |
| TRA 0130 Ask: To whom do you owe the outstanding balance? | FMCC | TRADELIENNAM | TRA 0140 |
| | Wells Fargo | Wells Farg TRADELIENNAM | TRA 0140 |
| | First Security | First Secu TRADELIENNAM | TRA 0140 |
| | Other | | TRA 0131 |
| TRA 0131 Ask: To whom do you owe the outstanding balance? | Continue | | TRA 0140 |

FIG. 38

| CLNT TST002 | | PRINT 415 RECORDS - REPORT 022 | | | RUN 09/10/97 15:35:40 | PAGE= 13 |
|---|---|---|---|---|---|---|
| STEP SEQ | SCRIPT TEXT | ANSWER | GOTO | PUT DATA | IN FIELD | STEP SEQ |
| | | | | | TRADELIENNAM | |
| TRA 0140 | Okay, let me tell you how the Used Vehicle Buyer will evaluate on your trade, so you'll have a good idea of the process he uses. | Continue | | | | TRA 0150 |
| TRA 0150 | First he checks the BODY for damage. This includes the Top, Hood, Fenders, Doors, Deck lid, Bumper, Grill, Paint, and Glass. | Continue | | | | TRA 0160 |
| TRA 0160 | Next he checks the DRIVE TRAIN. This includes examining the engine and transmission, the alternator, battery and cables, starter, pump and compressor, radiator, hoses and belts, emission control, clutch, U joints, differential and exhaust system. | Continue | | | | TRA 0170 |
| TRA 0170 | Third, he checks the RUNNING GEAR. This includes looking at each tire for wear, examining the wheels, caps and brakes. He'll look at the wheel alignment, whether the tires have been rotated properly, the steering adjustment, springs, shocks and the front end. | Continue | | | | TRA 0180 |
| TRA 0180 | Finally, he looks over the interior. He looks at the upholstery, mats and carpet, A/C and heater, radio - tape - antenna, headliner, seats, windows, sun roof, windshield wiper and washer, instruments, horn lights - signals - lenses, tire jack and spare, and tools. | Continue | | | | TRA 0190 |
| TRA 0190 | The reason I go into such detail on how we appraise your trade is this, we want to give you a fair price. We also want you to understand what we evaluate to make up that fair price. It includes excess mileage, wear and tear, and repairs necessary for us to turn around and sell the car to another customer like you. | Continue | | | | TRA 0200 |
| TRA 0200 | Based on your experience with this vehicle, and what I've told you so far, how would you rate the CONDITION of this vehicle? You are not required to answer this question. | POOR (wholesale) FAIR (major recon) GOOD (recondition) | | POOR FAIR GOOD. | TRADECOND TRADECOND TRADECOND | TRA 0240 TRA 0240 TRA 0240 |

FIG. 39

| | EXC (retail as is) | EXC | TRADECOND | TRA 0240 |
|---|---|---|---|---|
| TRA 0240 Okay, that'll do it. | Continue | | | TRA 0250 |
| TRA 0250 I will turn in your vehicle information to our Used Vehicle Buyer and he will give us the Houston market value on the car. Will you loan me the keys for a few minutes? | Continue | | | TRA 9999 Y |

FIG. 40

CLNT TST002                PRINT 415 RECORDS - REPORT 022                    RUN 09/10/97 15:35:40    PAGE= 14

| STEP | SEQ  | SCRIPT TEXT | ANSWER | GOTO | PUT DATA | IN FIELD | STEP | SEQ |
|------|------|-------------|--------|------|----------|----------|------|-----|
| U01  | 0010 | Let's walk this way. Back here in service we have six SERVICE ADVISORS with a combined total of over 75 years experience in the dealership service industry. The plaques you see outside each one's office are for the customer service awards they've won. | Continue | | | | U01 | 0020 |
| U01  | 0020 | Every person who works in this dealership takes an annual course on what we call the CUSTOMER-FOR-LIFE philosophy. Have you heard of it? | Yes<br>No | | | | U01<br>U01 | 0025<br>0030 |
| U01  | 0025 | Well then you already know that.... | Continue | | | | U01 | 0030 |
| U01  | 0030 | The CUSTOMER-FOR-LIFE philosophy means we don't just sell you one vehicle and then never see you again. We want to follow up to make sure you are satisfied with the vehicle and with every single service experience you have at ABC Motors. We try to build a relationship with you so that you will want to come back to us. | Continue | | | | U01 | 0045 |
| U01  | 0045 | This is our LUBE, OIL, FILTER center. We reconstructed it last year and have a 27 minute guarantee on getting you in and out, or your LOF is free. As you can see, you can also view the activities of the LOF center from the customer lounge. | Continue | | | | U01 | 0050 |
| U01  | 0050 | Here is our CUSTOMER LOUNGE. As you see, it is equipped with free telephones, fax machine, coffee, and morning snacks for your use if you choose to wait for your vehicle while it is serviced. | Continue | | | | U01 | 0060 |
| U01  | 0060 | We also have a SHUTTLE SERVICE in the mornings so you can drop your vehicle off and then go to work without waiting on your vehicle. | Continue | | | | U01 | 0070 |
| U01  | 0070 | This is our CASHIER. | Continue | | | | U01 | 0080 |
| U01  | 0080 | Let's go through this door to get to the front area. Now down this hallway is the picture of the dealership back in | Continue | | | | U01 | 0090 |

FIG. 41

```
         |    |                                                      |          |     |      |
         |    | in 1955.  We also post some of the nice letters customers |          |     |      |
         |    | have written us on our WALL OF FAME.                 |          |     |      |
         |    | Now let's go get you those figures.                  | Continue |     |      |
         |----|------------------------------------------------------|----------|-----|------|
         | U01| 0090 The water fountain and the restrooms are down that hall |          | U01 | 9999 Y
         |    | if you need them.  May I offer you a coke?           |          |     |      |
         |    |                                                      |          |     |      |
```

FIG. 42

```
CLNT TST002                      PRINT 415 RECORDS - REPORT 022                    RUN 09/10/97  15:35:40   PAGE=  15

STEP SEQ  SCRIPT TEXT                                              ANSWER               GOTO PUT DATA  IN FIELD   STEP SEQ  *
---- ----  ------------------------------------------------------  -------------------  ---- --------  --------   ---- ----
U02  0010  Why buy from ABC Motors?                                Dealer                                         U02  0020
                                                                   Inventory                                      U02  0200
                                                                   Parts and Service                              U02  0400
                                                                   Rental                                         U02  0500
---- ----  ------------------------------------------------------  -------------------  ---- --------  --------   ---- ----
U02  0020  Choose one of the following reasons for buying at       "No Problem" Philo                             U02  0030 Y
           ABC Motors.  "Dealer Stories"                           Mission Statement                              U02  0040 Y
                                                                   #1 Ford Volume                                 U02  0050 Y
                                                                   More                                           U02  0021
---- ----  ------------------------------------------------------  -------------------  ---- --------  --------   ---- ----
U02  0021  Choose one of the following reasons for buying at       Top 100 Club                                   U02  0060 Y
           ABC Motors (cont'd).  "Dealer Stories"                  #1 Jeep Volume                                 U02  0070 Y
                                                                   Eagles Club                                    U02  0080 Y
                                                                   More                                           U02  0022
---- ----  ------------------------------------------------------  -------------------  ---- --------  --------   ---- ----
U02  0022  Choose one of the following reasons for buying at       Top Hyundai Volume                             U02  0090 Y
           ABC Motors (cont'd).  "Dealer Stories"                  Customer Loaners                               U02  0100 Y
                                                                   Main Menu                                      U02  0010
                                                                   End                                            U02  9999
---- ----  ------------------------------------------------------  -------------------  ---- --------  --------   ---- ----
U02  0030  "No Problem" Philosophy:                                More                                           U02  0040
           For over 40 years, ABC Motors has had one simple goal,  Previous Menu                                  U02  0020
           to exceed our customers' expectations.  Our "No Problem" Main Menu                                     U02  0010
           Philosophy means that we always look for a way to ensure End                                           U02  9999
           that this goal is met.  Our mission statement is on a card
           that we all carry.  It was developed and approved by the
           over 200 employees that we have here at ABC Motors.
---- ----  ------------------------------------------------------  -------------------  ---- --------  --------   ---- ----
U02  0040  Mission Statement:                                      Continue                                       U02  0045
           We at ABC Motors are fully committed to providing
           an automotive experience that exceeds our customers'
           expectations.
---- ----  ------------------------------------------------------  -------------------  ---- --------  --------   ---- ----
U02  0045  Mission Statement (cont'd):                             More                                           U02  0050
                                                                   Previous Menu                                  U02  0020
           Our emphasis on teamwork, combined with a high level of Main Menu                                      U02  0010
           dedication and integrity, further define this commitment End                                           U02  9999
           to excellence.
```

FIG. 43

```
U02 0050  #1 Ford Volume:  We know we've been successful because....   More            U02 0060
                                                                       Previous Menu   U02 0020
          More people buy a Ford from us than any of the other 150     Main Menu       U02 0010
          Ford dealers in the Texas region.  We've been the top        End             U02 9999
          volume Ford dealership for the past 4 years: 1993-1996.

U02 0060  Top 100 Club:  We know we've been successful because....     More            U02 0070
                                                                       Previous Menu   U02 0020
          We're also a member of the prestigious Top 100 Club, a       Main Menu       U02 0010
          national award from Ford for dealers who combine             End             U02 9999
          outstanding volume with outstanding customer satisfaction.
```

FIG. 44

CLNT TST002                    PRINT 415 RECORDS - REPORT 022           RUN 09/10/97  15:35:40    PAGE= 16

| STEP | SEQ | SCRIPT TEXT | ANSWER | GOTO | PUT DATA | IN FIELD | STEP | SEQ |
|------|-----|-------------|--------|------|----------|----------|------|-----|
| U02 | 0070 | #1 Jeep Volume: We know we've been successful because.... | More | | | | U02 | 0080 |
| | | | Previous Menu | | | | U02 | 0020 |
| | | More people buy a Jeep from us than any of the other 85 | Main Menu | | | | U02 | 0010 |
| | | Jeep dealerships in the Texas region. We've been the top | End | | | | U02 | 9999 |
| | | Jeep dealership for the past 2 years: 1994 and 1995. | | | | | | |
| U02 | 0080 | Eagles Club: We know we've been successful because.... | More | | | | U02 | 0090 |
| | | | Previous Menu | | | | U02 | 0020 |
| | | We're also a member of the prestigious Eagles club, a | Main Menu | | | | U02 | 0010 |
| | | national award from Chrysler for dealers who combine | End | | | | U02 | 9999 |
| | | outstanding volume with outstanding customer satisfaction. | | | | | | |
| U02 | 0090 | Top Hyundai Volume: We know we've been successful because.. | More | | | | U02 | 0100 |
| | | | Previous Menu | | | | U02 | 0020 |
| | | We are also a top Hyundai dealership with excellent | Main Menu | | | | U02 | 0010 |
| | | satisfaction scores. | End | | | | U02 | 9999 |
| U02 | 0100 | Customer Loaners: We know we've been successful because.... | Continue | | | | U02 | 0105 |
| | | Our Service Department is also top-notch. In addition to | | | | | | |
| | | top caliber technicians and equipment, we also have our | | | | | | |
| | | Customer Loaner Program available for a small fee. This | | | | | | |
| | | exclusive program, available only at ABC Motors, | | | | | | |
| U02 | 0105 | Customer Loaners: (cont'd) | More | | | | U02 | 0110 |
| | | | Previous Menu | | | | U02 | 0020 |
| | | provides a free rental car any time that your vehicle is | Main Menu | | | | U02 | 0010 |
| | | in for repairs -or- maintenance, as well as giving you | End | | | | U02 | 9999 |
| | | free TX state inspection. | | | | | | |
| U02 | 0110 | We look forward to welcoming you into our family of | Continue | | | | U02 | 0200 |
| | | completely satisfied customers. We are #1 for a lot of | Previous Menu | | | | U02 | 0020 |
| | | very good reasons. Experience the ABC Motors difference. | Main Menu | | | | U02 | 0010 |
| | | | End | | | | U02 | 9999 |
| U02 | 0200 | Choose one of the following categories for buying at | New Cars and Truck | | | | U02 | 0205 |
| | | ABC Motors. "Inventory Stories" | Used Cars and Truc | | | | U02 | 0300 |
| | | | Main Menu | | | | U02 | 0010 |
| | | | End | | | | U02 | 9999 |

FIG. 46

CLNT TST002                    PRINT 415 RECORDS - REPORT 022                    RUN 09/10/97 15:35:40  PAGE= 17

| STEP SEQ | SCRIPT TEXT | ANSWER | GOTO | PUT DATA | IN FIELD | STEP | SEQ | * |
|---|---|---|---|---|---|---|---|---|
| | competitive programs available for our customers. | | | | | | | |
| U02 0220 | New Cars and Trucks - Over 1,000 vehicles: | Continue | | | | U02 | 0230 | |
| | | Previous Menu | | | | U02 | 0200 | |
| | Being the largest also means that our selection of new cars and trucks is the best around. At any point in time, we have over 1,000 new vehicles available for you to select from... this means the right vehicle for you, ready to take home with you today. | Main Menu | | | | U02 | 0010 | |
| | | End | | | | U02 | 9999 | |
| U02 0230 | New Cars and Trucks - Great Pricing: | Continue | | | | U02 | 0240 | |
| | | Previous Menu | | | | U02 | 0200 | |
| | And, of course, no one can sell as many cars and trucks as we do, without having great pricing. This combination of price and selection is just not available anywhere else in the region. | Main Menu | | | | U02 | 0010 | |
| | | End | | | | U02 | 9999 | |
| U02 0240 | ABC Motors is, therefore, the only place to buy your new car or truck. Be part of our family of completely satisfied new vehicle owners. | Continue | | | | U02 | 0300 | |
| | | Previous Menu | | | | U02 | 0200 | |
| | | Main Menu | | | | U02 | 0010 | |
| | | End | | | | U02 | 9999 | |
| U02 0300 | At ABC Motors, our reputation is at stake every time we sell a used car or truck. For years our customers have come to us expecting the finest in sales and service, and we've gone to extraordinary measures to ensure that every vehicle on the lot meets their expectations. | 200 to choose from | | | | U02 | 0310 | Y |
| | | Proud to sell | | | | U02 | 0320 | Y |
| | | Thorough reconditi | | | | U02 | 0330 | Y |
| | | More | | | | U02 | 0301 | |
| U02 0301 | More choices (cont'd). Used Cars and Trucks. | 3 Month / 3,000 M1 | | | | U02 | 0340 | Y |
| | | Financed on the Sp | | | | U02 | 0350 | Y |
| | | Main Menu | | | | U02 | 0010 | |
| | | End | | | | U02 | 9999 | |
| U02 0310 | Used Cars and Trucks - 200 to choose from: We usually carry at least $1 million in late model, low mileage vehicles. This represents around 200 premium cars and trucks at any one time. Since we sell more new Ford's and new Jeep's than anyone else in the Texas region, and | Continue | | | | U02 | 0320 | |
| | | Previous Menu | | | | U02 | 0300 | |
| | | Main Menu | | | | U02 | 0010 | |
| | | End | | | | U02 | 9999 | |

FIG. 47

```
                    are a top Hyundai dealership as well, we have our pick of
                    a huge volume of vehicles for resale on our lot.
---- ---- ----------------------------------------------------------- ------------------ --- ----
U02  0320 Used Cars and Trucks - Proud to sell:                       Continue           U02 0330
                                                                      Previous Menu      U02 0300
          This also means that we can be very choosy about what we    Main Menu          U02 0010
          offer, and we are.  Any vehicles that we wouldn't be proud  End                U02 9999
          to sell, we simply sell to the wholesalers, who then
          re-sell to other lots.
---- ---- ----------------------------------------------------------- ------------------ --- ----
U02  0330 Used Cars and Trucks - Thoroughly recondition:              Continue           U02 0340
                                                                      Previous Menu      U02 0300
          We thoroughly recondition AND clean every hand-picked used  Main Menu          U02 0010
```

FIG. 48

| CLNT TST002 | | PRINT 415 RECORDS - REPORT 022 | | | RUN 09/10/97 15:35:40 PAGE= 18 | |
|---|---|---|---|---|---|---|
| STEP | SEQ | SCRIPT TEXT | ANSWER | GOTO PUT DATA | IN FIELD | STEP SEQ * |
| | | car and truck that we sell, following an extensive mechanical, electrical, and cosmetic checklist. | End | | | U02 9999 |
| U02 | 0340 | Used Cars and Trucks - 3 month / 3,000 mile: Each used vehicle is backed by a 3 month / 3,000 mile guarantee. Since our vehicles are so good, extended service plans are available for even longer periods of time. | Continue Previous Menu Main Menu End | | | U02 0350 U02 0300 U02 0010 U02 9999 |
| U02 | 0350 | Used Cars and Trucks - Financing on the spot: Financing is available right on the spot at very competitive terms, and we even have great lease programs if you want the lowest payment possible. | Continue Previous Menu Main Menu End | | | U02 0360 U02 0300 U02 0010 U02 9999 |
| U02 | 0360 | If you are thinking of a quality pre-owned vehicle, see what impressive quality really means in a used car or truck. We look forward to welcoming you into our family of completely satisfied customers. We are #1 for a lot of very good reasons. Experience the McCafferty difference. | Continue Previous Menu Main Menu End | | | U02 0400 U02 0300 U02 0010 U02 9999 |
| U02 | 0400 | Choose one of the following reasons for buying at ABC Motors. Service and Parts: | Convenient Personal Advisor State-of-the-art More | | | U02 0410 Y U02 0420 Y U02 0430 Y U02 0401 |
| U02 | 0401 | Choose one of the following reasons for buying at ABC Motors. Service and Parts: (cont'd) | Saves Money Accurate Repairs "Do it right" More | | | U02 0440 Y U02 0450 Y U02 0460 Y U02 0402 |
| U02 | 0402 | Choose one of the following reasons for buying at ABC Motors. Service and Parts: (cont'd) | Main Menu End | | | U02 0010 U02 9999 |
| U02 | 0410 | Service and Parts - Convenient: | Continue | | | U02 0420 |

FIG. 49

```
PRINT 415 RECORDS - REPORT 022                                    RUN 09/10/97  15:35:40    PAGE= 19

STEP SEQ  SCRIPT TEXT                                              ANSWER           GOTO PUT DATA  IN FIELD   STEP  SEQ
-------  ---------------------------------------------------       ---------------  ---- --------  --------   ----  ----
         Our factory-trained technicians always work with the      Main Menu                                  U02   0010
         latest state-of-the-art equipment.                        End                                        U02   9999

U02 0440 Service and Parts - Saves Money:                          Continue                                   U02   0450
                                                                   Previous Menu                              U02   0400
         This means accurate diagnostics, and efficient repair     Main Menu                                  U02   0010
         methods that save you valuable time and money.            End                                        U02   9999

U02 0450 Service and Parts - Accurate Repairs:                     Continue                                   U02   0460
                                                                   Previous Menu                              U02   0400
         We have over 40 service technicians and a HUGE inventory  Main Menu                                  U02   0010
         of parts available for every level of repair. This means  End                                        U02   9999
         prompt and accurate handling of any service needs that
         you have.

U02 0460 Service and Parts - "Do it right":                        Continue                                   U02   0470
                                                                   Previous Menu                              U02   0400
         This caring attention to your service needs is a tradition Main Menu                                 U02   0010
         that we've maintained since our founding in 1955, and is  End                                        U02   9999
         one of our primary reasons for our success over 40 years.
         We are dedicated to the "do it right the first time, every
         time" philosophy.

U02 0470 We look forward to your visit. We are devoted to your     Continue                                   U02   0500
         complete satisfaction.                                    Previous Menu                              U02   0400
                                                                   Main Menu                                  U02   0010
                                                                   End                                        U02   9999

U02 0500 Choose one of the following reasons for buying at         200 Vehicles                               U02   0510 Y
         ABC Motors.                                               Competitive Rates                          U02   0520 Y
                                                                   Convenient                                 U02   0530 Y
         We take our Rental Department very seriously. If your     More                                       U02   0501
         impression of dealership rental departments is that they
         aren't REALLY in the business, prepare for us to exceed
         your expectations.

U02 0501 Choose one of the following reasons for buying at         Top Choice                                 U02   0540 Y
         ABC Motors. (cont'd)                                      Main Menu                                  U02   0010
```

FIG. 51

```
                                                           End                                U02  9999

----  ----                                        -----------------    ----  ----
                                                    Continue           U02   0520
                                                    Previous Menu      U02   0500
                                                    Main Menu          U02   0010
                                                    End                U02   9999

We take our Rental Department very seriously.  If your
impression of dealership rental departments is that they
aren't REALLY in the business, prepare for us to exceed
your expectations.

----  ----
U02  0510  Rental - 200 vehicles:

We offer a full range of over 200 Ford and Jeep/Eagle cars
           and trucks as well as specialty vehicles such as:
              * 4x4's          * Luxury Conversion vans (TV's, VCR's)
              * Cargo vans     * 15 Passenger vans
              * Convertibles
```

FIG. 52

```
PRINT TSTU02              PRINT 415 RECORDS - REPORT 022                    RUN 09/10/97 15:35:40    PAGE=   20

STEP SEQ  SCRIPT TEXT                                              ANSWER           GOTO PUT DATA  IN FIELD    STEP  SEQ
----  ----  ----------------------------------------------------   --------------   ---- --------  --------    ----  ----
U02  0520  Rental - Competitive Rates:                             Continue                                    U02   0530
                                                                   Previous Menu                               U02   0500
           We have very competitive rates.  Deeply discounted weekly  Main Menu                                U02   0010
           and monthly rates are also available for your convenience. End                                      U02   9999
----  ----  ----------------------------------------------------   --------------   ---- --------  --------    ----  ----
U02  0530  Rental - Convenient:                                    Continue                                    U02   0540
                                                                   Previous Menu                               U02   0500
           We are open the same hours as the dealership, offering  Main Menu                                   U02   0010
           very convenient pick-up and drop-off, early in the morning End                                      U02   9999
           or late in the evening.
----  ----  ----------------------------------------------------   --------------   ---- --------  --------    ----  ----
U02  0540  Rental - Top Choice:                                    Continue                                    U02   0550
                                                                   Previous Menu                               U02   0500
           If you need short term transportation, ABC Motors is    Main Menu                                   U02   0010
           your top choice.                                        End                                         U02   9999
----  ----  ----------------------------------------------------   --------------   ---- --------  --------    ----  ----
U02  0550  We are dedicated to your complete satisfaction.         Previous Menu                               U02   0500
                                                                   Main Menu                                   U02   0010
                                                                   End                                         U02   9999
----  ----  ----------------------------------------------------   --------------   ---- --------  --------    ----  ----
```

FIG. 53

PRINT TSTORE
PRINT 415 RECORDS - REPORT 022
RUN 09/10/97 15:35:40  PAGE= 21

| STEP SEQ | SCRIPT TEXT | ANSWER | GOTO | PUT DATA | IN FIELD | STEP SEQ |
|---|---|---|---|---|---|---|
| WAN 1320 | Do you mind if I ask you a few questions about your automotive needs? | Go ahead | | | | WAN 1400 |
| | | No | | | | WAN 1330 |
| | | Why? | | | | WAN 1330 |
| | | Not much time aval | | | | WAN 1340 |
| WAN 1330 | What we can do is full out the questions together on this computer, then we'll have a better idea of what you want. | | | | | |
| WAN 1330 | I have found that by getting all of this down on the computer, I gain a better sense of your needs. Plus, we'll easily be able to pull it back up should you return to us or call back at a later date. So, will it be all right if I ask you a few questions? | Yes | | | | WAN 1400 |
| | | No | | | | WAN 1350 |
| WAN 1340 | I have found that by better learning what your needs are, we can SAVE YOU TIME in finding the perfect vehicle. Plus, by making note of your needs, you won't have to spend time re-explaining what you want when you call or return at a later date. So will it be all right if I ask a few questions? | Yes | | | | WAN 1400 |
| | | No | | | | WAN 1350 |
| WAN 1350 | That's fine. I respect your wishes. | | | | | SEL 9999 |
| | Do you have any questions that I can answer? | Yes | | | | WAN 1380 |
| | | No | | | | |
| WAN 1380 | Well, my name is..... If you need any assistance I'll be standing out in front of the showroom, please don't hesitate to call out to me. Also, here's my card if you decide you have questions about our inventory when you get home. | Continue | | BEB | | SEL 9999 |
| WAN 1400 | Do you already have a particular vehicle in mind? | Right here | | | | WAN 1405 |
| | | Yes | | | | WAN 1450 |
| | | No | | | | WAN 1450 |
| WAN 1405 | Great, let me enter the stock number and vehicle information. | Continue | | | UNIT1STOCKNO | WAN 1410 |
| WAN 1410 | Is the vehicle new or used? | New | | N | WANTNEWUSED | WAN 1415 |

FIG. 54

CLNT TSTOO2     PRINT 415 RECORDS - REPORT 022                    RUN 09/10/97 15:35:40    PAGE= 22

| STEP SEQ | SCRIPT TEXT | ANSWER | GOTO | PUT DATA | IN FIELD | STEP | SEQ |
|---|---|---|---|---|---|---|---|
| | Pre-Owned vehicle? | Used | | U | WANTNEWUSED | WAN | 1455 |
| | | Haven't decided | | - | WANTNEWUSED | WAN | 1455 |
| | | | | FORD | WANTCARMAKE | | |
| WAN 1455 | Are you looking for a car, truck, sports utility vehicle, or minivan/van? | Car | | C | WANTCARTRUCK | WAN | 1460 |
| | | Truck | | T | WANTCARTRUCK | WAN | 1460 |
| | | Sports Utility | | T | WANTCARTRUCK | WAN | 1460 |
| | | Van | | T | WANTCARTRUCK | WAN | 1460 |
| | | | | 1 | WANTATVEHCAR | | |
| | | | | 1 | WANTATVEHPUP | | |
| | | | | 1 | WANTATVEHSPT | | |
| | | | | 1 | WANTATVEHVAN | | |
| WAN 1460 | Do you have a particular MAKE in mind? | Yes | | | | WAN | 1465 |
| | | No | | | | WAN | 1475 |
| WAN 1465 | What YEAR vehicle are you looking for? Enter "oldest" year acceptable: | Continue | | | WANTCARMAKE | WAN | 1470 |
| WAN 1470 | Do you have a particular MODEL in mind? | Continue | | | WANTCARYRLO | WAN | 1480 |
| WAN 1475 | Do you prefer a particular BODY STYLE? | Yes | | | WANTCARMODEL | WAN | 1480 |
| | | No | | | | WAN | 1480 |
| WAN 1480 | What is the oldest vehicle YEAR model you will purchase? | Continue | | | WANTCARBODY | WAN | 1490 |
| WAN 1490 | What is the newest YEAR model you prefer? | Continue | | | WANTCARYRLO | WAN | 1500 |
| WAN 1500 | What MAKE of vehicle do you currently drive? | Continue | | | WANTCARYRHI | WAN | 1520 |
| WAN 1520 | And what is the MODEL of the vehicle you currently | Continue | TRA | | TRADEMAKE | WAN | 1550 |

FIG. 56

| CLNT TST002 | | PRINT 415 RECORDS - REPORT 022 | | RUN 09/10/97 15:35:40 PAGE= 23 | | |
|---|---|---|---|---|---|---|
| STEP SEQ | SCRIPT TEXT | ANSWER | GOTO | PUT DATA | IN FIELD | STEP SEQ |
| WAN 1610 | What second feature do you most like about your current vehicle and really WANT on your new vehicle? (Such as 4WD, Nice Stereo, CD, power seats, alarm, leather, fuel economy). Enter WANT 2: | Continue | | | | WAN 1620 |
| WAN 1620 | What one feature have you never had but really want to have on your new vehicle? Enter WANT 3: | Continue | | | WANTMISC2 | WAN 1730 |
| WAN 1730 | Will this vehicle be for personal use or business use? | Personal<br>Business | | N<br>Y | WANTMISC3<br>BUSINESSUSE<br>BUSINESSUSE | WAN 1800<br>WAN 1740 |
| WAN 1740 | What line of business are you in? | Continue<br>Why? | | | BUYERTITLEOC | WAN 1800<br>WAN 1741 |
| WAN 1741 | It's helpful to know if you'll be making deliveries such as flowers, or making purchases such as antiques, or sell a product which need you to carry around, or carry clients to business appointments, or to work a ranch. | OK<br>No Info Given | | | BUYERTITLEOC | WAN 1800<br>WAN 1800 |
| WAN 1800 | Have you set your MONTHLY budget yet? | Yes<br>Don't know | | | | WAN 1810<br>WAN 1810 |
| WAN 1810 | Do any of these monthly figures come close to what you had in mind? | $350<br>$400<br>$450<br>More Choices | | 350<br>400<br>450 | BUDGET<br>BUDGET<br>BUDGET | WAN 1900<br>WAN 1900<br>WAN 1900<br>WAN 1830 |
| WAN 1830 | Write in your budgeted monthly payment. | Continue<br>Don't know yet | | | BUDGET | WAN 1900<br>WAN 1840 |

FIG. 58

PRINT 415 RECORDS - REPORT 022                                              RUN 09/10/97  15:35:40    PAGE= 24

| STEP SEQ | SCRIPT TEXT | ANSWER | GOTO | PUT DATA | IN FIELD | STEP | SEQ |
|---|---|---|---|---|---|---|---|
| WRI 0010 | After seating your prospects, offer them some refreshments if you haven't already done so. Folks, can I get you a refreshment? How about some coffee or a coke? | Continue | | | | WRI | 0020 |
| WRI 0020 | Read through the following screens as a refresher of what to do next, then hit HIDE SCRIPT and turn the computer so you both can see the screen. Use the Prospect Offer screen to enter the info. | Continue | OFF | | | WRI | 0030 |
| WRI 0030 | Okay, let's enter the numbers in the computer. The selling price is _____. The Houston area market value on your trade-in is _____. With $1000 down, let's see what your payment will be. You will now have to hit SUBMIT OFFER. We'll have to wait a moment while the computer calculates the payment. | Continue | | | | WRI | 0040 |
| WRI 0040 | Okay, the vehicle is available, and the payments are calculated.<br>• For a 48 month note, your payment would be _____.<br>• For a 24 month lease, your payment would be _____.<br>Which do you prefer? | Why is Lease so lo<br>Prefer Financing<br>Prefer Leasing | | | | WRI<br>WRI<br>WRI | 0050<br>0090<br>0090 |
| WRI 0050 | Ford is able to offer such a low lease payment because you are only paying for the portion of the vehicle you are using. We take the price of the vehicle today and subtract the guaranteed value of the vehicle at the end of the lease. This is the amount of the vehicle you are "using", and we finance this over a 24 or 36 month period. | Interested in Leas<br>Prefer Financing | | | | WRI<br>WRI | 0090<br>0090 |
| WRI 0090 | Click on the quote the prospect is most interested in. | Continue | | | | WRI | 0100 |
| WRI 0100 | All we need is your OK right here and we can get the paperwork started.<br>Note: Now be SILENT. Give the customer the pen and indicate the SUBMIT OFFER button. Wait for the customer to respond first. About 10% of your customers will sign on the first offer. Don't blow it by talking. | Continue | | | | WRI | 0110 |

FIG. 60

| | | |
|---|---|---|
| WRI 0110 Note: Hit HIDE SCRIPT now. Hit SHOW SCRIPT when you are ready to see the script again. Hit PREVIOUS if you'd like to go back to one of the previous scripts. | OK<br>Objections | WRI 1000<br>WRI 0200 |
| WRI 0200 Prospects objects to one or more of the following: | Price<br>Terms (Rate)<br>Trade Allowance<br>More | WRI 0300<br>WRI 0400<br>WRI 0500<br>WRI 0210 |
| WRI 0210 Prospects objects to one or more of the following: (cont'd) | Payment<br>Money Down<br>More | WRI 0600<br>WRI 0700<br>WRI 0220 |

FIG. 61

```
CLNT T:T002                        PRINT 415 RECORDS - REPORT 022                RUN 09/10/97  15:35:40   PAGE=   25

STEP SEQ  SCRIPT TEXT                                                    ANSWER              GOTO PUT DATA  IN FIELD    STEP SEQ

WRI 0020  Prospects objects to one or more of the following: (cont'd).   Not sure                                       WRI 0800
                                                                         Not buying today                               WRI 0810
                                                                         Spouse not here                                WRI 0820
                                                                         Need time to think                             WRI 0830

WRI 0300  We believe we offer our vehicles for a fair, already           Continue                                       WRI 0310
          discounted price. What price did you have in mind?                                               UNIT1SELL WRI 0310  Note: Hit HIDE SCRIPT and SUBMIT OFFER.                        Mgmt accepts offer                             WRI 0320
                                                                         Mgmt counter-offer                             WRI 0330

WRI 0320  All we need is your OK right here and we can get the           OK                                             WRI 1000
          paperwork started.                                             More Objections                                WRI 0200
          Note: Now be SILENT.  Give the customer the pen and
          indicate the SUBMIT OFFER button. Wait for the customer
          to respond first.

WRI 0330  Mgmt has responded with a counter-offer. All we need is        OK                                             WRI 1000
          your OK right here and we can get the paperwork started.       More Objections                                WRI 0200
          Note: Now be SILENT.  Give the customer the pen and
          indicate the SUBMIT OFFER button. Wait for the customer
          to respond first.

WRI 0400  Of course, this rate is based on an average person's           Apply for credit                               WRI 0410
          credit history. We can check your history now to determine    Increase Term                                   WRI 0430
          if your credit will get you a better rate or to see if
          you qualify for any special financing. We can also
          increase the term (months) to bring the payment down.

WRI 0410  Note: Hit the CBI step button now to begin gathering data      Continue                                       WRI 9999
          for the credit history check. Hit the WRI step button
          when you are ready to return to the write-up.

WRI 0430  Note: Hit HIDE SCRIPT, change the term, and hit SUBMIT         Mgmt accepts term                              WRI 0440
          OFFER.  You will then need to wait for the desk to respond.    Mgmt counter-offer                             WRI 0450
```

FIG. 62

```
WRI 0440  The computer has generated the new pmt.  All we need is      OK                WRI 1000
          your OK right here and we can get the paperwork started.     More Objections   WRI 0200
          N.te: Now be SILENT.  Give the customer the pen and
          indicate the SUBMIT OFFER button.  Wait for the customer
          to respond first.
---- ---- -------------------------------------------------------      ---------------   --- ----
WRI 0450  Mgmt has responded with a counter-offer.  All we need is     OK                WRI 1000
          your OK right here and we can get the paperwork started.     More Objections   WRI 0200
          Note: Now be SILENT.  Give the customer the pen and
          indicate the SUBMIT OFFER button.  Wait for the customer
          to respond first.
---- ---- -------------------------------------------------------      ---------------   --- ----
WRI       Of course, the trade value is based on the Houston market's  Maintenance record WRI 0510
```

FIG. 63

CLNT TST002                              PRINT 415 RECORDS - REPORT 022                        RUN 09/10/97  15:35:40    PAGE= 26

| STEP SEQ | SCRIPT TEXT | ANSWER | GOTO PUT DATA | IN FIELD | STEP SEQ |
|---|---|---|---|---|---|
| | demand for the vehicle and the condition of the vehicle. Can you tell me anything about the vehicle which I can pass on to the Used Vehicle Buyer to increase it's value? For example, can you provide us the maintenance records or allow the next owner to call you with questions about the vehicle? | Allow phone calls<br>Both<br>Just wants more $$ | | | WRI 0520<br>WRI 0530<br>WRI 0540 |
| WRI 0510 | Call the Used Vehicle Buyer. Tell him (with the customer present): My customer here is willing to provide us with maintenance records that indicate regular maintenance was performed on this vehicle. Will you allow him more money for his trade-in? | Continue | | | WRI 0570 |
| WRI 0520 | Call the Used Vehicle Buyer. Tell him (with the customer present): My customer here is willing to allow us to give the next customer his name and phone number to call if he has any questions. Will you allow him more money for his trade-in? | Continue | | | WRI 0570 |
| WRI 0530 | Call the Used Vehicle Buyer. Tell him (with the customer present): My customer here is willing to provide us with maintenance records that indicate regular maintenance was performed on this vehicle. And he is willing to allow us to give the next customer his name and phone number to call if he has any questions. Will you allow him more money for his trade-in? | Continue | | | WRI 0570 |
| WRI 0540 | How much more money do you think you need for your vehicle? | <$500<br>>$500 | | | WRI 0550<br>WRI 0580 |
| WRI 0550 | Call the Used Vehicle Buyer. Tell him (with the customer present): My customer doesn't have the maintenance records nor does he want a stranger calling him with questions about his old vehicle. However, he really believes his car is worth a few hundred dollars more. Is there anything you can do for him? Do you mind taking another look at the vehicle with the customer present? | Re-evaluate trade<br>More money<br>No more money | | | WRI 0560<br>WRI 0570<br>WRI 0580 |

FIG. 64

| | | | | |
|---|---|---|---|---|
| WRI 0560 | * If the buyer is available, say: Let's walk out to see the Used Vehicle Buyer now and we'll re-evaluate your trade-in.<br>* If the buyer is not available, say: The Buyer isn't available now. Let's proceed with the credit process while we wait. | Available<br>Not Available | | WRI 0570<br>WRI 0570 |
| WRI 0570 | Well, it looks like we can give you $_____ for your trade. Is this acceptable to you? | Yes<br>No | TRADEGROSS | WRI 0590<br>WRI 0580 |
| WRI 0580 | Well, it sounds as if you will have better luck with this vehicle selling it yourself, if you don't mind dealing with strangers or taking the chance of not selling it | Yes, trade-in<br>No, don't trade-in | 0<br>TRADEGROSS | WRI 0590<br>WRI 0590 |

FIG. 65

PRINT TST-02               PRINT 415 RECORDS - REPORT 022                    RUN 09/10/97 15:35:40    PAGE= 27

| STEP SEQ | SCRIPT TEXT | ANSWER | GOTO | PUT DATA | IN FIELD | STEP SEQ |
|---|---|---|---|---|---|---|
| | immediately. You also have a cost associated with advertising the vehicle and you lose the tax benefit from applying the trade to the new vehicle sale price. Would you like to proceed without the trade? | | | | | |
| WRI 0590 | Note: Hit HIDE SCRIPT and SUBMIT OFFER. | Mgmt accepts offer | | | | WRI 0591 |
| WRI 0600 | All we need is your OK right here and we can get the paperwork started.<br>Note: Now be SILENT. Give the customer the pen and indicate the SUBMIT OFFER button. Wait for the customer to respond first. | OK<br>More objections | | | | WRI 1000<br>WRI 0200 |
| WRI 0600 | Of course, there are several ways to decrease the payment. We can check your history now to determine if your credit will get you a better rate than the average rate we use as an example. We can also bump the term (months) up. You may also put more money down. | Better rate<br>Bump term<br>More money down<br>Other | | | | WRI 0410<br>WRI 0430<br>WRI 0700<br>WRI 0610 |
| WRI 0610 | More choices: | Trade allowance<br>Price | | | | WRI 0500<br>WRI 0300 |
| WRI 0700 | Of course, how much money would you like to put down? | Continue | | | DOWN PAYMENT | WRI 0310 |
| WRI 0800 | Just not sure: | Don't like ___<br>Something else ___<br>Not sure/need time | | | | WRI 0803<br>WRI 0200<br>WRI 0801 |
| | Many people just aren't 100% sure they are making the right move when they buy a new vehicle. Perhaps I can help you pinpoint what concerns you. Is there something about the vehicle you don't like? Or is it something else? | | | | | |
| WRI 0801 | Just not sure:<br>Well, I can understand your concern. Let me get a brochure with our prices together, you can take it home with you, and you can call me if you have any questions. That way you can consider your purchase at your leisure. | Continue | | | | WRI 0802 |

FIG. 66

PRINT 415 RECORDS - REPORT 022  RUN 09/10/97 15:35:40 PAGE= 28

| UNIT TST002 STEP SEQ SCRIPT TEXT | ANSWER | GOTO | PUT DATA | IN FIELD | STEP SEQ |
|---|---|---|---|---|---|
| WRI 0805 Let's find a vehicle for you that you really want. Let me check my computer to see if we have something else that better suits the needs you've described to me. | Continue | | | | WRI 0806 |
| WRI 0806 It may be necessary to switch the prospect on to another vehicle at this point. If this is the case, go back to the SEL (select) step to help them find another vehicle. Hit the SEL button now. | Continue | | | | WRI 9999 |
| WRI 0810 Not buying today: I respect that you are not planning to buy today. However, let me ask you one question. Is there any single item that is preventing you from coming to a decision today? What is that item? If we can take care of that, will you consider buying? | Yes<br>Not buying today | | | | WRI 0811<br>WRI 0812 |
| WRI 0811 Not buying today: (cont'd) You may need to hit the MANAGER button now for assistance. Or you may determine based on their answer that they absolutely won't be buying today. Or you may find that you can answer their objection yourself. | Continue | | | | WRI 0200 |
| WRI 0812 Not buying today: (cont'd) I'll respect your wishes. Let's make an appointment for you to come back in when you are closer to a decision. Would tomorrow or the next day be more convenient for you? | Continue | | | APPTDATE | WRI 0822 |
| WRI 0820 Spouse not here: I can certainly appreciate the fact that you would want your spouse involved in the decision. Allow me to gather all this information together for you so you can get on your way. | Continue | | | | WRI 0821 |
| WRI 0821 Spouse not here: Let's make an appointment for you and your spouse to return together. Would this evening or tomorrow be more convenient? | Continue | | | APPTDATE | WRI 0822 |

FIG. 68

| | | | APPTIME | WRI | 0823 |
|---|---|---|---|---|---|
| WRI 0823 | And what time would be best for you? 7pm? 7:30pm? | Continue | | | |
| WRI 0823 | Now, you will call me if something changes on your end, won't you? And I'll do the same for you if something changes on my end. Where can I reach you or your answering machine? | HOME PHONE<br>WORK PHONE<br>CELL PHONE<br>NO PHONE GIVEN | | WRI<br>WRI<br>WRI<br>WRI | 0825<br>0826<br>0827<br>0828 |
| WRI 0825 Home phone: | | Continue<br>Work# also given | | WRI<br>WRI | 0828<br>0826 |
| WRI 0826 Work phone: | | Continue | | WRI | 0828 |

FIG. 69

```
CLNT TST002                              PRINT 415 RECORDS - REPORT 022                RUN 09/10/97  15:35:40   PAGE=  29

STEP SEQ  SCRIPT TEXT                                                    ANSWER                 GOTO PUT DATA  IN FIELD    STEP SEQ
--------  -----------                                                    ------                 ---- --------  --------    --------
                                                                                                                           WRI 0827
WRI 0827  Cell phone:                                                    Cell# also given
                                                                         Continue                                          WRI 0828
                                                                         Home# also given                                  WRI 0825

WRI 0828  Great, I'll see you then.                                      Continue                                          WRI 0829

WRI 0829  Note: Walk the prospect out, and if you aren't sure of         Continue                                          WRI 9999
          their biggest obstacle to purchase, ask the following....
          I'd like to ask one last question of you.  When you go
          home to think about this decision, what will be your
          biggest concern?  Perhaps I'll be able to think of a
          way to address it before you return.

WRI 0830  Need time to think:                                            OK - ready to sign                                WRI 1000
                                                                         Still need time                                   WRI 0840
          Take all the time you need.  Why don't I leave you alone       More objections                                   WRI 0200
          for a moment to process everything.  Can I get you anything
          while I'm up?

WRI 0840  Still need more time: (cont'd)                                 Continue                                          WRI 0822
          I'll respect your wishes.  Let's make an appointment for
          you to come back in when you are closer to a decision.
          Would tomorrow or the next day be more convenient                                                    APPTDATE
          for you?

WRI 1000  Note: Congratulations on completing the write-up step.         Continue                                          WRI 9999
          The next step is the credit application process.

PRINT ENDED AT:      15:36:05
```

FIG. 70

PORTABLE SALES PRESENTATION SYSTEM WITH SELECTIVE SCRIPTED SELLER PROMPTS

CROSS-REFERENCE TO RELATED APPLICATION

This application is a continuation in part of "parent" application Ser. No. 08/587,276, filed Jan. 18, 1996, now U.S. Pat. No. 5,826,240 which is incorporated by reference in its entirety.

BACKGROUND OF THE INVENTION

Source Code Appendix

The microfiche appendix filed herewith contains computer-program source code and database information for an illustrative implementation of the invention. The source code is copyrighted and is the property of the assignee of this application. Authorization is granted to make copies of the source code in conjunction with making facsimiles of this application and any patent(s) issuing thereon, but all other rights are reserved.

Introduction

The cost of any goods or services that are sold include costs of marketing. Every item (tangible or intangible) that is sold has included in its costs, the costs of "selling" it. Millions of people are employed in "selling" and hundreds of millions of man-hours are expended in direct face-to-face "selling" every year in the United States. The cost of "selling" is every bit as real a part of the cost of an item or service as is the direct labor cost involved in manufacturing the item or providing the service.

It is generally estimated that less than 10 percent of a salesperson's total time is spent actually "selling"—i.e. the direct face-to-face contact with a prospective buyer. Therefore the efficiency of the face-to-face sales process is directly related to the quality with which the face-to-face contact is carried out.

The present invention relates to a computer system that addresses some common information-flow problems in a large "industry," namely the sales process. The computer system organizes specific information to assist salesmen or saleswomen (referred to generically as "sellers") and management in making a presentation to a potential purchaser ("prospect"), in a methodical and consistent manner. Use of the system by a seller produces a number of practical benefits, including a more effective matching of the prospect's needs to one or more specific products or services to the needs of the prospect, as well as faster determination of appropriate financing arrangements. This in turn results in a more satisfactory experience for the prospect and better on-the-job training for an inexperienced seller, both of which lead to more effective utilization of capital by the seller or his or her employer.

In a nutshell, the computer system reduces costs associated with selling, resulting in exactly the same benefits— lower cost and more effective utilization of capital—as systems which reduce costs associated with research, development, design, manufacturing, maintenance, etc.

Human-Factors Problems in Large-Volume Sales Organizations

The sales process can be usefully thought of as an interaction between a prospect and a seller. When performed correctly, the process comprises a logical series of exchanges of information between the seller and the prospect, between the seller and management, between management and a credit bureau, etc. The actual steps will vary depending upon the type of product and the industry, but the concept of the sales process being a sequence of definable information exchanges remains the same.

Historically, however, the actual process of selling, when done on a large scale, has been a disorganized one. Some people are thought of as "born sellers" and need little training to be effective. With suitable training, many other individuals can learn the sales process and achieve good results. In large sales organizations such as car dealerships, however, turnover is frequently high. As a result, it is often not possible to count on having a population of sellers who all either are born sellers or have had suitable training. That means that variations in natural ability and training lead to what amount to inefficiencies of scale, with a concomitant reduction in productivity.

Such inefficiencies are not inherent to large-scale sales. A significant weakness of selling on a large scale is the inability to enforce a certain measure of standardization of the sales process on large numbers of sellers so that they consistently utilize proven sales techniques.

Sales efficiency (defined here as the ratio between sales consummated to prospective buyers dealt with) improves dramatically when sellers record sufficiently complete data on sales prospects to achieve other goals, such as follow-up communication by phone or mail with those prospects that did not make a purchase, correct determination of closing ratios for each individual seller, or analysis of the advertising source that initially captured the prospect's attention. Inefficient sellers can be given additional training or, if necessary, weeded out when correct determination of sales efficiency ratios for individual sellers can be made accurately, quickly, and with reduced overhead. Advertising efficiency (defined here as the ratio of advertising dollars spent to the gross sales volume produced) is enhanced by analyzing the advertising sources that initially capture prospect attention.

An illustration of the need for such a system can be seen in a car dealership, an area in which very large dollar volume sales occur and the sales process is sometimes poorly administered. In general, dealerships have several characteristics in common:

1. Due to less-than-perfect (or even virtually non-existent) pre-employment screening, dealerships may hire sellers that lack true sales proficiency, a problem in most types of retail sales operations.
2. Due to long hours, Saturday work days, and a poor industry image, car dealerships may suffer from high levels of personnel turnover, particularly in the sales departments (in which 100%+turnover per year is not uncommon).
3. Due to turnover, dealerships are faced with a constant re-training need, which in some cases is poorly accomplished.
4. Many dealerships hire experienced sellers from other dealerships on the assumption that they are good at what they do and do not require training, when in fact these experienced sellers may use very poor sales techniques.
5. Many dealerships refrain from hiring new, inexperienced sellers because they do not want to make an investment in training or suffer loss of productivity as a new seller comes up to speed.
6. Ironically, dealerships do not want to invest in sales training precisely because turnover is high and the investment would be "wasted" in their view. This tends to produce high failure rates among new sellers.

Prior Attempts at Standardizing the Sales Process

A scattered few vehicle manufacturers (e.g., Lexus, Infiniti, and Saturn) have spent large amounts of time and money attempting to improve the quality and consistency of procedures to if control the sales process. Dealerships that exert control over the vehicle sales process have in general been far more successful than those that have not. Many of these dealerships have elaborate pencil and paper control procedures. Some employ computerized systems, but as far as is known they record data only after the fact.

Long-Felt Need

Despite the modest success of these procedures, direct real-time supervision of the sales process has long been recognized as difficult. To be effective, such supervision must take place where the sales presentations are made, i.e., in changing physical locations throughout the dealership, not at a desk or counter where a supervisor can observe. A sales manager's presence during the conversations between the seller and the prospect, however, is likely to undermine the rapport-building that can be critical to the success of the sales process.

The problem is exacerbated by the need for ready communication between the seller and his or her manager, or "control desk." Thus, the need for direct managerial supervision is simultaneously created and made more difficult by the nature of the business. The need is highlighted by the fact that, because considerable advertising dollars are invested in attracting new business to the dealership, each prospect that is handled less than optimally may represent a substantial lost profit opportunity.

SUMMARY OF THE INVENTION

A computer system in accordance with the present invention addresses many of these problems, including improvement, standardization, and enforcement of the sales process; efficient training of new sellers; and real-time control of the process by management. The system comprises one or more handheld computer units used by sellers that may be linked with a central computer unit. Each dealership decides the exact sequence that it would like its sellers to follow. The handheld unit then prompts the seller with a standard script to be followed at each step in the process after a prospect enters the dealership. The prospect's responses to the scripted questions are used to identify the prospect's motivation (e.g., safety) or specific interest (e.g., trailer towing capacity). Software switches can be used to indicate motivations or specific interests. The switches are monitored during the sales presentation. When a motivation or interest is identified, the handheld unit prompts the seller to introduce information corresponding to the identified interest.

BRIEF DESCRIPTION OF THE DRAWINGS

FIGS. 3 through 21 are screen prints of illustrative screen displays created on a handheld unit by a specific implementation of software in accordance with the invention. The screen displays, discussed in more detail below, implement the invention for a car dealership.

FIGS. 22 through 70 are illustrative scripts used in a specific implementation of the invention for a car dealership. The organization of the scripts is discussed below.

DETAILED DESCRIPTION OF SPECIFIC EMBODIMENTS

Overview of Illustrative Embodiment

One illustrative embodiment of the invention takes the form of a system for enforcing recording, by a seller, of information about a vehicle-purchase prospect at an automobile dealership. In the interest of clarity, not all features of an actual implementation are necessarily described in this specification, although many additional details of such an implementation can be found in the microfiche appendix. It will of course be appreciated that in the development of any such actual implementation (as in any computer-system development project), numerous engineering and programming decisions must be made to achieve the developers' specific goals and subgoals (e.g., compliance with system- and business-related constraints), which will vary from one implementation to another. Moreover, attention will necessarily be paid to proper programming practices for the environment in question. It will be appreciated that such a development effort might be complex and time-consuming, but would nevertheless be a routine undertaking of system development for those of ordinary skill having the benefit of this disclosure.

Figure 1:
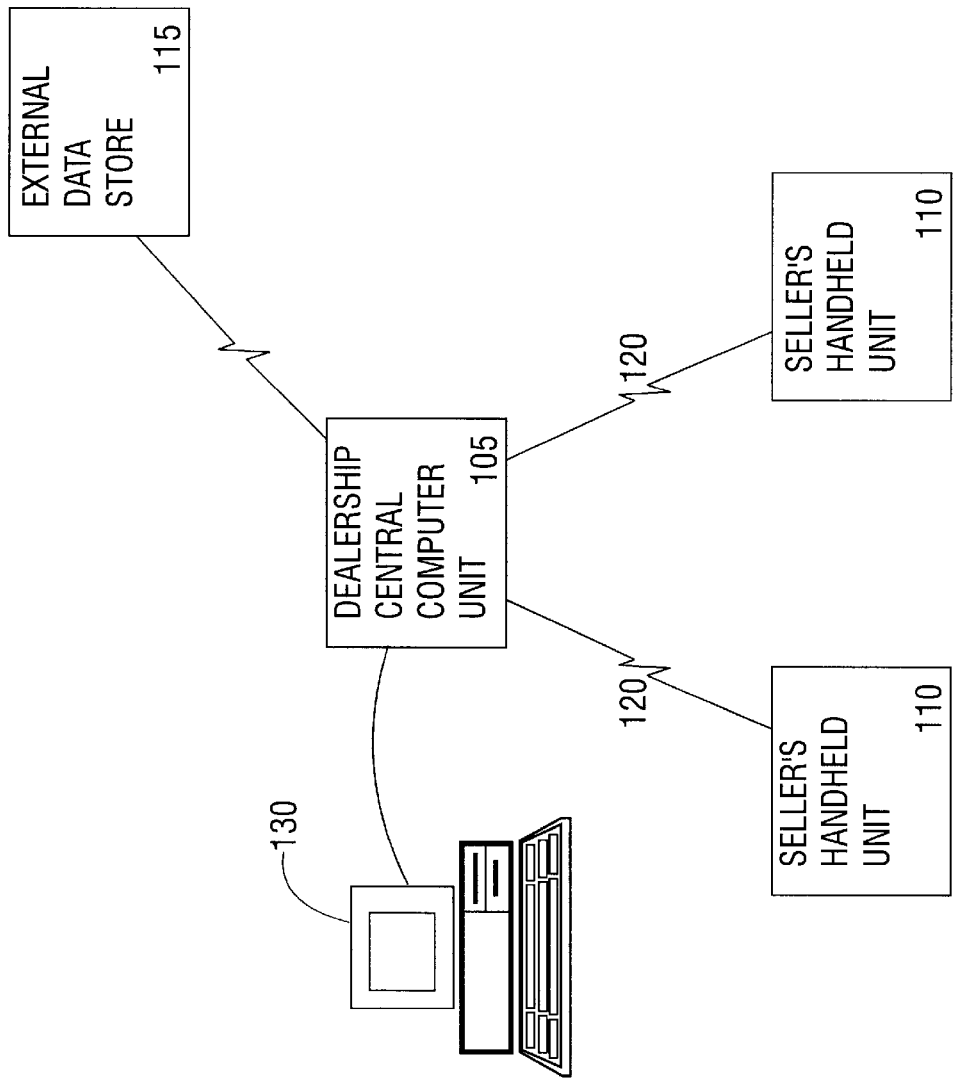
FIG. 1 is a block diagram of a system in accordance with the invention.

As shown in FIG. 1, at its most basic, the illustrative system comprises one or more seller computer units 110 operated by sellers and may also include a central computer 105. The seller computer unit 110 may be of a size suitable to held in a seller's hand, referred to simply as a "handheld" unit, although it may be held in the seller's hand, used on a table or on the seller's lap, suspended from a strap around the seller's neck, etc. The illustrative examples discussed below all involve such handheld units. Alternatively, the seller computer unit 110 may comprise a fixed unit, e.g., a desktop computer with suitable programming.

The handheld computer unit 110 manages a sales-information data store, utilizing any convenient database management system (DBMS) software. This sales-information data store may also be located on the central computer. The external data store(s) are remotely located at places such as vehicle manufacturers, credit bureaus, and credit granting institutions on their computer systems 115.

The Sales-Information Data Store

The sales-information data store, which may be maintained at or by the handheldz computer unit 110, or at the central computer 105, or both, includes a number of specific databases. Virtually any of the databases referred to herein can be either local databases on the handheld unit (updated periodically from a central computer or other data store, e.g., via a serial or parallel cable, a network connection, a radio link, or an infrared link) or remote databases located on the central computer, accessed through a conventional disk search or through an on-line query. Some or all of the databases may be combined if desired into a single complex database, as will be recognized by those of ordinary skill having the benefit of this disclosure. The databases include:

(1) a vehicle-inventory information database, which can include both a dealer's database as well as those vehicles in the inventory of other dealerships in a commonly owned group of dealerships. Inventory information is valuable when the seller cannot locate the particular item sought by the prospect;

(2) a customer database, containing conventional information about customers who have made purchases, enabling the seller to identify a prospect as a valuable repeat customer if one should return to the dealership;

(3) a prospect database, likewise containing similar information about prospects who have visited the dealership. With this information, management can determine if there is a pattern in the point at which sales processes are breaking down, or whether a certain seller suffers from very poor sales efficiency. Very importantly by interrogating this database a prospect can be identified as a returning prospect. A returning prospect, known in the auto industry as a "be-back" prospect, has a percentage likelihood of successful consummation of sale that is easily triple that of a prospect on a first time visit. The reason for this is that a "be-back" prospect has completed his or her shopping process and is now ready to make a purchase. For this reason a "be-back" prospect is especially valuable and deserves special attention. Further, the availability of such information saves the time involved in re-entry of data if the prospect returns to the dealership at a later date;

(4) a pending-transaction database, referred to colloquially herein as a "deal" database. Typically a record is started in the pending-transaction database when the first actual offer is made to or by the prospect. Stored information on pending transactions allows managers to monitor sales transactions as they are taking place, enabling them to insert themselves into the sales process if a deal begins to turn sour; and (5) control-record information, which can provide, for example: data on financing and leasing plans; data on taxes and fees that would apply to the particular sale; information on other products or services frequently sold in conjunction with the desired purchase item, information on commission rates that apply to various components of the sale, or the sequence and content of each step in the sales process.

External Data Stores

Useful information may be contained within databases at one or more external data stores 115 such as manufacturers, credit bureaus, and credit-granting institutions. For example, vehicle manufacturers commonly maintain real-time updated databases of vehicles on order, in production, in transit, and in the inventories of all dealerships nationwide. When a situation is encountered where the dealership does not have on hand the vehicle that the prospect desires, the seller can access this external data store from a handheld computer to see if a suitable unit exists somewhere in the distribution system.

These external data stores may be accessed directly from the handheld unit or through the communications network to the central computer that has a conventional modem attachment to the telephone network to the vehicle manufacturer.

The Hand-Held Computer Unit

The handheld computer unit 110, referred to as a handheld unit, may be a custom designed unit or a suitably programmed subnotebook computer or personal digital assistant (PDA). It may be a stand-alone unit; or it may be designed for use as a smart wireless terminal in a larger system including a central computer unit 105; or it may be designed to operate in either stand-alone or smart-terminal mode at the user's option.

A) WIRELESS LINK 120: The handheld unit 110 may have a conventional communications interface or link 120 to the central computer unit 105 or to other handheld unit(s) 110, preferably a wireless link 120 to enable user mobility. The wireless link 120 may take the form of, e.g., a radio modem, an infrared beam, or similar devices.

B) INPUT DEVICE: The handheld unit 110 has a conventional input device operable by the seller for recording data about the prospect, along with suitable conventional programming for managing the input process. The input device may take the form of, e.g., a keyboard; a touchscreen such as those found on many PDAs; a pointing device such as a mouse, trackball, or J-stick; or a voice-recognition unit. The input device may also have an audio recording input capability.

C) TRANSMISSION OF PROSPECT DATA: The handheld unit 110 may include programming for transmitting prospect data to the central computer unit 105 or to other handheld units 110 via the communications link. The prospect data may be transmitted to the central computer unit 105, but may also be retained locally at the handheld unit 110.

D) SALES INFORMATION REQUESTS: The handheld unit 110 includes programming for interrogating the sales-information data store to obtain information requested by the seller. This may include, e.g., inventory information to determine which cars are in stock or can be obtained quickly.

E) DISPLAY: The handheld unit 110 includes a conventional display (e.g., an LCD display) and suitable programming for displaying requested sales information to the seller. As noted above, display of the requested information may be contingent on the seller having entered all required prospect data and complying with steps in the sales communications process that is required by sales management.

F) LOCAL DATA STORE: The handheld unit 110 may include a local data store (e.g., readwrite memory or "RAM," flash memory, or a hard disk drive) for locally storing some or all of the sales information data store. This permits the handheld unit 110 to operate independently of the central computer unit 105 if desired, advantageously reducing wireless communications traffic and permitting use of the handheld unit 110 if the central computer or wireless communications link are inoperable.

G) EXTERNAL DATA STORE: The handheld unit 110 may access databases at external locations such as the external data store 115 via direct communications or by communications over the wireless link 120 to a central computer 105, which has a conventional communications link over telephone lines to the external data store. The communications link may be a modem-type link or a direct digital connection, e.g., an IDSN line, a T1 or T3 line, etc.

Sales Communication Process

A) SPECIFIED SEQUENCE: The handheld unit 110 includes programming to prompt the seller to perform a specified sequence of steps in a desired sales communication process. The programming may take the form of pre-stored scripts, in a suitable macro-like script language, that are conventionally interpreted by an interpreter (or alternatively are conventionally compiled into executable form) and which, when executed by the handheld unit 110, cause the handheld unit 110 to display appropriate messages on a display.

Different scripts may be used for different sales contexts. For example, a script for an inperson visit by a prospect may prompt the seller to handle the encounter differently than for a telephone inquiry.

The sales communications process(es), and thus the script (s), will normally include obtaining prospect data and recording it in a data store in the handheld unit 110; the scripts preferably take into account the prospect data as it is entered by the seller. For example, if the initial prospect data entered by the seller indicates that the prospect is young, then the programming script may prompt the seller to ask whether the prospect would be interested in a first-time-buyer financing package and to record that prospect data.

B) PRODUCT PRESENTATIONS: The handheld unit 110 may include programming to display a series of scripted product features and benefits. These scripts may vary based upon the particular product that the prospect is interested in. A comprehensive product presentation is key element of a successful sales process.

c) RECORDING OF DATA: For greater usefulness of the system, the seller is asked to record the prospect's personal information such as name, address, etc., early in their meeting. As the seller records the information into the handheld unit 110, the information may be conventionally transmitted (on a real-time basis or periodically in a batch) to other handheld units 110 or to the central computer unit 105 for storage in the appropriate database for use in a conventional sales prospect follow-up system. Thus, no matter how the sales transaction ends, the dealership will always have a record of the prospect's visit and can follow-up the visit with a letter or phone call.

Human factors are a disincentive to comply with recording of prospect data: Since sellers are evaluated on their sales efficiency, they have a disincentive to record data on prospects that do not purchase since this would reflect negatively on their sales efficiency ratios. Historically for this reason sellers in this situation have done a very poor job of collecting prospect data in spite of its obvious usefulness to the dealership.

d) INCENTIVES TO COMPLY WITH SALES PROCESS: Notably, the sales-information-request programming of the handheld unit 110 includes one or more program routines to deny access by the seller to the sales-information data store and to the remote communications links to the external data sources, and to display an appropriate reminder message, if the seller has not complied with the specified steps in the sales process. This gives the seller a large incentive both to comply with the process and to record data as required by the process. For example, the program routines may prevent the handheld unit 110 from accessing the vehicle-inventory information database if all required prospect data has not been entered. Alternatively, the routines may permit the handheld unit 110 to obtain the requested data from the sales information data store, but then not permit the data to be displayed until all required prospect data has been entered. As with many of the program routines described for the handheld unit 110, these program routines may equivalently be located in and control the central computer unit 105 to prevent that unit from transmitting requested data to the handheld unit 110.

e) TIME STAMPS: The illustrative handheld unit 110 includes suitable conventional programming for recording time stamps to identify the time and/or duration of performance of respective steps in the desired sale communication process. The time stamp records are used to record the actual time (either clock time or elapsed time during the sales encounter) at which the seller records specified information. This permits sales management to confirm with reasonable confidence that the seller is in fact performing the appropriate steps in the sales communication process instead of, e.g., recording fabricated or "bogus" data all at once. For example, if the manager sees that a certain seller's tour of the dealership facilities with a prospect lasted only 15 seconds, the manager knows the seller has circumvented that step in the process and can counsel him or her. The time stamps can both be recorded locally at the handheld unit 110 or uploaded to the central computer unit 105 via the communications link for statistical analysis of seller performance. Alternatively, the time stamp records can be created at the central computer unit 105 as prospect data and other data are transmitted by the handheld unit 110.

f) EXTERNAL CHECKS ON PROCESS COMPLETION: Suitable programming can be included in the handheld unit 110, the central computer unit 105, or both, for receiving and processing a signal from an external device indicating that a specified step in the sales communication process has been completed. The external device may be, e.g., a sensor in an vehicle key storage machine that signals when a particular seller, identified by a password or an electronic keycard (similar to a bank automated teller machine card), checks out the keys to a car for a test drive. Other external devices may be advantageously utilized to verify the physical location of the seller at a particular time, thus serving as an additional check on the seller's compliance with the specified sales communication process.

Similarly, programming can be included for sending a signal to a gate controller to open a vehicle access gate. The seller, when driving out of the dealership parking lot for a test drive, thus can use the handheld unit 110 to send a signal to the gate controller, either directly or via the central computer unit 105. The handheld computer 110 logs the fact that the seller is leaving the premises on a test drive with the prospect in question. Again, this verification of the seller's physical location at a particular time serves as a check on the seller's compliance with the sales process.

g) SELECTIVE AUDIO RECORDING: Conventional hardware and suitable programming may be included in the handheld unit 110 for selective audio recording of a conversation between the seller and the prospect. Selective audio recording of the actual conversation between the seller and the prospect can be useful. For example, Saleswoman A may be known to perform well in obtaining initial prospect wants and needs. Audio recording of this portion of her conversation with the prospect may be deemed unnecessary and thus can be skipped. On the other hand, Salesman B may be weak in this area; when he indicates on the handheld unit 110 that he is in this phase of the desired sales communication process, the handheld unit 110 may automatically commence audio recording until the next phase of the conversation. Sales management is then able to selectively listen to the actual sales process as it progressed and counsel the seller on sales techniques. If required by privacy laws, the handheld unit 110 may be programmed to play an audible message on commencement of recording, such as "to help ensure quality service, this conversation may be monitored or recorded."

h) FINANCING ASPECTS: The handheld unit 110 may include programming for transmitting identifying information about the prospect and a creditworthiness inquiry to a financial institution computer 125, and for receiving and processing a creditworthiness report from that computer. If the handheld unit 110 includes an input device that can store a signature digitally, then the prospect can be asked to "sign" an authorization granting the dealership permission to access the user's credit history. The input device may be a conventional pen- and touch-screen interface of the kind found in some PDAs; a similar device of the kind found at some cash registers for credit card authorizations; or the like. Access to the financial institution computer 125 may be via direct link or may be through a conventional data link such as a modem controlled by the central computer unit 105. The financial institution may be a credit bureau or an actual financing source. In the latter case, the financing source may perform its own credit check and make a preliminary creditworthiness determination to be transmitted back to the seller. This in turn helps the seller qualify the prospect, i.e., to determine the price range of the vehicle for which the prospect is likely to be able to obtain financing.

i) COMPUTATION OF FINANCE TERMS: The handheld unit 110 may include conventional programming enabling the seller to use it as a financial calculator for calculating, e.g., lease payments, loan payments, and the like. As the sales process progresses, the prospect data, creditworthiness report, and finance terms may be transferred to another handheld unit 110 or a central computer system 105 for finalization of paperwork or for negotiation purposes as described below.

j) REAL-TIME NEGOTIATION: The handheld unit 110 programming may include routines to permit the seller to send offers to and counteroffers to other handheld computers 110 or the central computer unit 105. A sales manager or similar person may read and respond to these exchanges, e.g., using another handheld unit 110 or a terminal 130 attached to the central computer 105. By eliminating most of the seller's trips back and forth from the prospect to the sales manager's desk, much of the time needed to consummate a sale is reduced. This reduction of time spent in the negotiating process is a vital element in improving sales efficiency since if this process becomes extended, the prospect is increasingly likely to have misgivings and decline to consummate the sale. The capacity for real-time negotiation becomes increasingly valuable in situations of high activity (like a Saturday), when there are a large number of sellers per sales manager, when the average experience level of sellers is low, when there is a large number of sellers working at a single location, or when the physical distances at a given location between sellers and sales management are large.

k) REAL-TIME SALES PROGRESS DISPLAY: The programming of the handheld unit 110 may include routines for real-time computation and display of sales progress information applicable to the transaction. For example, the likelihood of closing the sale may be estimated and displayed on the handheld unit 110 by comparing factors such as (a) the length of time that the prospect has consented to spend with the seller during each step of the sales process, and/or (b) the number of steps in the process that have been completed, with historical data on previous sales process outcomes (e.g., stored in the sales information data store) for that dealership, that city, etc. This likelihood may be displayed in a variety of ways (e.g., a percentage number, a gas-gauge indicator, etc.) to show the likelihood of closing the sale going up as each step is completed. This encourages the seller to perform each step thoroughly, taking sufficient time to communicate the desired information to the prospect.

l) REAL-TIME SALES COMMISSION DISPLAY: The programming of the handheld unit 110 may include routines for real-time computation and display of the commission that would be paid to the seller if the sale were to be consummated on the specified terms. This can serve as a powerful sales motivator for the seller.

m) COMPARATIVE RANKING AMONG SELLERS: The handheld unit 110 may also be programmed to display a list of sellers at the dealership, ranked by performance for a given period, e.g., by sales achieved in a given month. This constantly updated real-time display of sales rankings also can serve as a sales motivator for sellers.

n) DETERMINATION OF PARTICULAR PROSPECT INTERESTS: The programming and data structures of the handheld unit 110 may also be designed such that answers to scripted questions provide an indication of the prospect's general interests (sometimes referred to here as "motivations") or specific interests (sometimes referred to here as "hot buttons"). For example, the prospect's responses to questions may indicate that the prospect is generally interested in safety. Other typical prospect motivations include performance, economy, and style, to name but a few examples. Moreover, the prospect may be specifically interested in features of a car such as air bags, trailer towing packages, etc. Some or all of these various interests may have different degrees of importance to different prospects.

If a prospect's answers to questions (alone or in combination) indicate the presence of one or more general interests or specific interests, that fact(s) is noted by setting one or more flags within an appropriate data structure, either within the handheld unit 110 or within the central computer unit 105. The handheld unit 110 then prompts the seller to ask specific additional scripted questions or make specific additional comments related to that interest to help focus the discussion. The handheld unit 110 thus helps the seller do what an expert seller likely would do intuitively.

This can be implemented in a variety of ways. For example, the programming of the handheld unit 110 may be designed so that the required flags are maintained in a suitable data structure in memory within the handheld unit. The term "flag" is used here to include values of specific data variables. For example, if a prospect's responses indicate that she has two children, ages 4 and 2, the fact that she has children and their respective ages may be recorded in appropriate variables and used as flags concerning safety as a motivation and for fold-down child seats as a possible hot button. Then again, if the prospect's answers indicate that she affirmatively does not plan to use the car to carry her children (e.g., she is buying the car for her college-bound oldest child), the fact that she has younger children may be overridden.

The overall logic of the programming in this regard is quite simple: At one or more appropriate points in the encounter between the seller and the prospect, if a flag is set indicating that the prospect has a particular motivation (as determined, e.g., by the prospect's responses to particular questions), then the seller is prompted to provide information or ask questions relevant to that motivation. For example, if a flag is set indicating that safety is a motivation for the prospect, then at one point in the encounter the seller is prompted to mention the fact that the vehicle has side air bags; at another point the seller is prompted to mention the vehicle's built-in, fold-down child seats; and so on.

Motivation switches and hot buttons of this kind can also be implemented in whole or in part in the central computer unit 105. For example, the central computer unit may determine from the prospect's ZIP code that the prospect lives in an area in which mini-vans are popular. In response, it may prompt the seller, via the handheld unit 110, to suggest to the prospect that "you know, a lot of people in your neighborhood are buying this model of mini-van."

As would be apparent to one skilled in the art, conventional programming methods can be used to determine a prospect's motivations and hot buttons. Thus, the actual implementation of the required programming is immaterial here.

o) SELECTIVE PRESENTATION OF PRODUCT OPTIONS: Many products sold to the public include various options. For example, cars, trucks, and similar vehicles often come with options such as air conditioning, a trailer-towing package, built-in child seats, etc. A seller will frequently make a sales presentation about a specific example of a product, e.g., a specific car or truck on the lot. It may be desirable for the seller to talk only about options actually installed on that specific car or truck. An experienced seller is likely to know this. A novice seller, on the other hand, may not be aware which options are installed on the particular car or truck (or may not even be aware of the extent of the available options).

The programming and data structures of the handheld unit 110 therefore may be designed to be sensitive to the actual options installed on a particular vehicle. The vehicle identification may be obtained and inputted into the handheld unit 110 in any convenient manner, e.g., by selecting from a menu of available vehicles having specified characteristics or by direct entry of the factory-applied vehicle identification number (VIN). Information about the options installed on that particular vehicle may be stored in the sales-information data store as described above.

The programming for the sales communication process can then easily be designed to prompt the seller to talk at a suitable point about the specific options already installed on the vehicle, e.g., in response to the motivation switches and hot buttons described above. The script for the sales communication process can include suitable remarks for the seller to make, e.g., "this particular car has the new high-performance engine already installed." Additional information about the option can be displayed if desired, either automatically or in response to a command inputted by the seller.

The programming and data structures of the handheld unit 110 can also be designed to provide the seller with a list of options that could be installed on that vehicle if desired. In that way, if the prospect indicates interest in other options, the seller can respond with an appropriate list.

If the prospect indicates interest in an option not already installed on that vehicle, the handheld unit 110 may identify from the sales-information data store a vehicle that does already contain that option and display that information to the seller.

If the prospect is trying to decide which specific vehicle he or she prefers, the handheld unit 110 may display a compare-and-contrast list of options for each vehicle, e.g., in table form.

It will be appreciated by those of ordinary skill having the benefit of this disclosure that programming of these option-sensitive features is conventional. A simple implementation entails providing, in the sales-information data store, a data structure with option information about each specific vehicle on the lot. Depending on the implementation, the data structure may include a flag indicating the presence of an option and/or more detailed information about the option. The portion of the programming that causes display of a script on the handheld unit 110 simply checks the data structure to determine whether a particular option is present and modifies the script accordingly (possibly depending on other factors such as whether the prospect has expressed any interest in the option).

P) INCORPORATING PROSPECT INFORMATION INTO CUSTOMIZED SCRIPTS: The data collected about the prospect during the sales presentation can be used to customize the script displayed to the seller through simple parameter substitution. The customized script can reflect information such as the prospect's name, spouse's name, children's names, current vehicle owned, mileage on current vehicle, etc. This may help the inexperienced seller build a rapport with the propsect in the same way that experienced sellers do. The customization can be readily implemented in conventional fashion in the programming of the handheld unit 110, the central computer unit 105, or both, as convenient.

The simplest example of such customization is probably the parameterized substitution of the client's name into the script. Some sellers believe that use of the prospect's name is a key factor in building a rapport with the prospect. Suppose that the seller has input data into the handheld unit 110 (or retrieved it from the sales-information data store) indicating that the prospect is female, she is a physician, and her last name is Jones. At an appropriate point the script might include a reminder to work the prospect's name into the conversation. The unsubstituted script might read "<Title><Last_Name>, if you have time, let's take a test drive." As displayed to the seller on the handheld unit 110, it would read "Dr. Jones, if you have time, let's take a test drive."

As a more sophisticated example, suppose that the prospect, Dr. Jones, has said that she has a one-year old son John and that she is interested in a particular model of mini-van because it has built-in child seats. If the script is option-sensitive as described above, at an appropriate point it can suggest that the seller make a comment such as "You see the child seats back here they're designed for children three months to five years old, so <Child_Name>should be able to use it till he's big enough to go without one." As displayed to the seller on the handheld unit 110, the script reads". . . so John should be able to use it till he's big enough to go without one."

Q) "RECAPPING" SCRIPT SEGMENT: One skill of an experienced seller is the ability to remember those features of a product that aroused the prospect's interest during the sales communication process and to recap them orally during the closing stages of the process. To the extent that the seller provided data to the handheld unit 110 indicating the prospect's interest in specific options (or if the data was already present in a sales-information data store), then upon a suitable command from the seller (possibly in response to a reminder prompt from the handheld unit 110), a recap list of those options is displayed on the handheld unit 110. Alternatively, the handheld unit 110 can display the recap list automatically when the information available suggests that the sales communication process has entered a specified phase.

R) "MANAGER HELP" BUTTON: For any given prospect, an inexperienced seller is likely to encounter difficulties at some point. The seller might not be saying the right things at the right time. There might be a personality conflict, mild or severe. There are undoubtedly dozens of reasons why any given sales communication process might go badly for an inexperienced seller.

Consequently, inexperienced sellers are trained to go get their managers if they sense that they are losing control of the sales communications process with a given prospect. Unfortunately, this often entails a seller asking the prospect to wait while the seller finds the manager. As often as not, the prospect seizes the opportunity to depart gracefully—resulting in a lost sales opportunity. This can cause inexperienced sellers to be reluctant to leave the prospect to ge the manager. In those cases where an experienced sales manager can be discretely brought into the sales communication process, however, there is a reasonable chance that the situation can be turned around and the prospect converted into a buyer.

To address this situation, the handheld unit 110 may include a "Manager Help" button. The Manager Help button is very similar in concept to the "panic button" found on handheld units available for some home-security systems—a householder can keep the handheld unit on or near his or her person; pressing the panic button transmits a signal to the security service, which sends someone to investigate.

The Manager Help button may be conventionally implemented in hardware or, preferably, in software as an icon or menu choice on the display of the handheld unit 110. When the seller "hits the button" (literally or figuratively), the handheld unit 110 signals the central computer unit 105 that a manager's assistance is required. The central computer unit 105 then generates an appropriate message on, e.g., a terminal in the sales manager's office. The message may include information such as the seller's identity and a summary of what has transpired in the sales communication process with that prospect. The sales manager can then "stop by" and very naturally introduce him- or herself into the sales process.

The Manager Help button can be implemented so that pressing the button brings up a menu or a series of icons indicating different kinds of available assistance. The available assistance might include items such as "Soft drinks" (resulting in someone coming to take the prospect's drink order), "Service department," (resulting in a service-department representative coming to join the conversation), and the like. One or more of these items can be in addition to, or in lieu of, the manager assistance described above.

s) CACHING OF SCRIPTS, ETC.: If a suitably fast wireless link is available between the handheld unit 110 and the central computer unit 105, then the handheld unit can be programmed to interact with the central computer unit on a real-time basis while in use and while in range of the central computer unit. Thus, when a seller is using the handheld unit 110 in range of the central computer unit, it effectively acts as a wireless terminal for the latter unit.

In that way, the seller uses the most current version of the scripts, sales information, etc. (referred to here as the "information load" of the handheld unit), as is practicable. That means, for example, that the seller will have up-to-date information about the vehicle inventory; he or she will not attempt to sell a prospect a vehicle that has already been sold, nor attempt to show a vehicle that is already being test-driven by another prospect (assuming that such information is kept current in the central computer unit 105).

But the handheld unit 110 is designed to be used in a mobile environment. There likely will be times when the handheld unit is out of range of the central computer unit 105, e.g., if the seller is on a test drive with a prospect.

To address that problem, the information load may be periodically downloaded from the central computer unit 105 into storage (preferably nonvolatile storage such as a hard disk drive or nonvolative RAM) on the handheld unit 110. That makes the information load available for use by the seller even if the handheld unit loses contact with the central computer unit. In concept, such downloading is much like the "caching" of Web pages, graphics, etc., by browsers such as Microsoft's Internet Explorer and Netscape's Navigator, so that the Web pages and graphics can be viewed even if the user does not have a current connection to the Internet.

The downloading operation is preferably performed automatically upon startup of the handheld unit 110, e.g., through the use of an AUTOEXEC.BAT file or a Windows 95 Startup program. Such downloading, when successful, ensures that the handheld unit gets a current information load.

t) DATA COMPRESSION: If desired, the downloading may use data-compression and—decompression techniques to speed up the data transmission. That is, the central computer unit 105 may use any of a variety of conventional data-compression algorithms to substitute short strings of characters in place of long strings. For example, in the so-called dictionary approach, the central computer unit 105 would transmit comparatively short codes in place of longer strings of data characters; the handheld unit 110, using a compatible dictionary, would translate the codes back into the original longer strings of data characters. (The programming of the handheld unit 110 can be designed to store the data in compressed form and decompress on an as-needed basis instead of decompressing it immediately upon receipt.) Well-known examples of dictionary-based data compression include those pioneered by Lev and Zimpel as well as several variations on the basic LZ approach such as Lev-Zimpel-Welch (LZW); in these examples, dictionaries are built up "on the fly" to match the actual data transmitted.

u) REFRESH-TYPE UPDATING: If the information load is downloaded into nonvolatile storage in the handheld unit 110, the downloading operation can be conventionally designed to function in the well-known "refresh" mode. That is, the central computer unit 105 determines which portions of the desired current information load are already present in the handheld unit 110 and downloads only those portions that are not already present. The refresh operation may be performed in any convenient manner. One simple approach is for the central computer unit 105 to send a signal to the handheld unit 110 directing the handheld unit to provide a directory listing of the separate data files making up its information load, including the dates and times of each file. That information can be used by the central computer unit to determine which files should be updated. Alternatively, conventional record-level marking or tagging can be used to determine which if any record(s) in a database of scripts, sales information, etc., are candidates for updating.

v) PERIODIC UPDATING OF DATA: After initialization of the information load, selected portions thereof may be updated from time to time to reflect ongoing changes in the sales information data store. For example, a car dealership may refresh its handheld units 110 by downloading updated data whenever a specific vehicle is sold, so that other sellers will no longer attempt to test-drive that vehicle; or whenever new vehicles are added to the inventory. The update operation may be performed on a periodic basis, e.g., once per hour, once every four hours, etc. It may also be performed on an as-needed basis, e.g., when an inventory item (such as a specific vehicle) is sold or is added to the inventory. The update operation could be performed in some combination of periodic and as-needed basis. The update operation may be initiated by each handheld unit 110 or by the central computer unit 105.

Description of Specific Illustrative Embodiment

Figure 2:
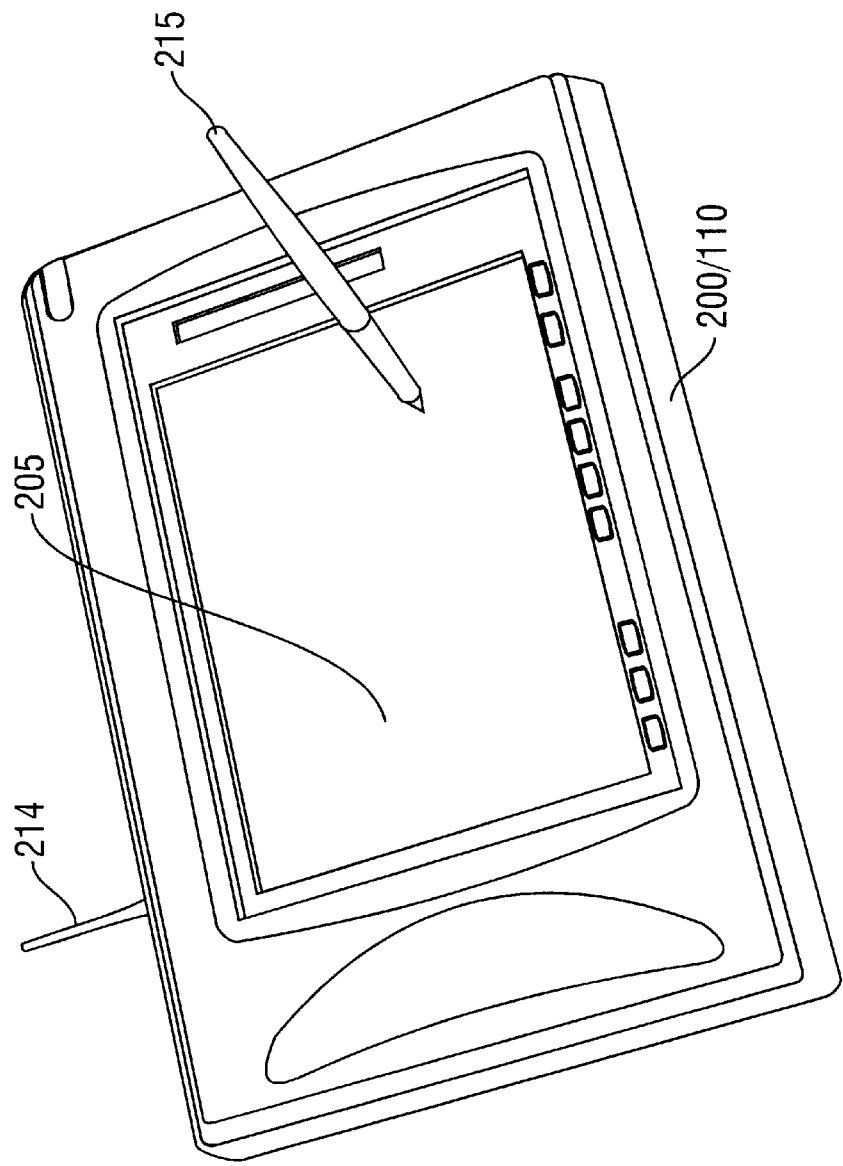
FIG. 2 is a perspective view of a specific embodiment of a handheld unit in accordance with the invention.
Figure 17:
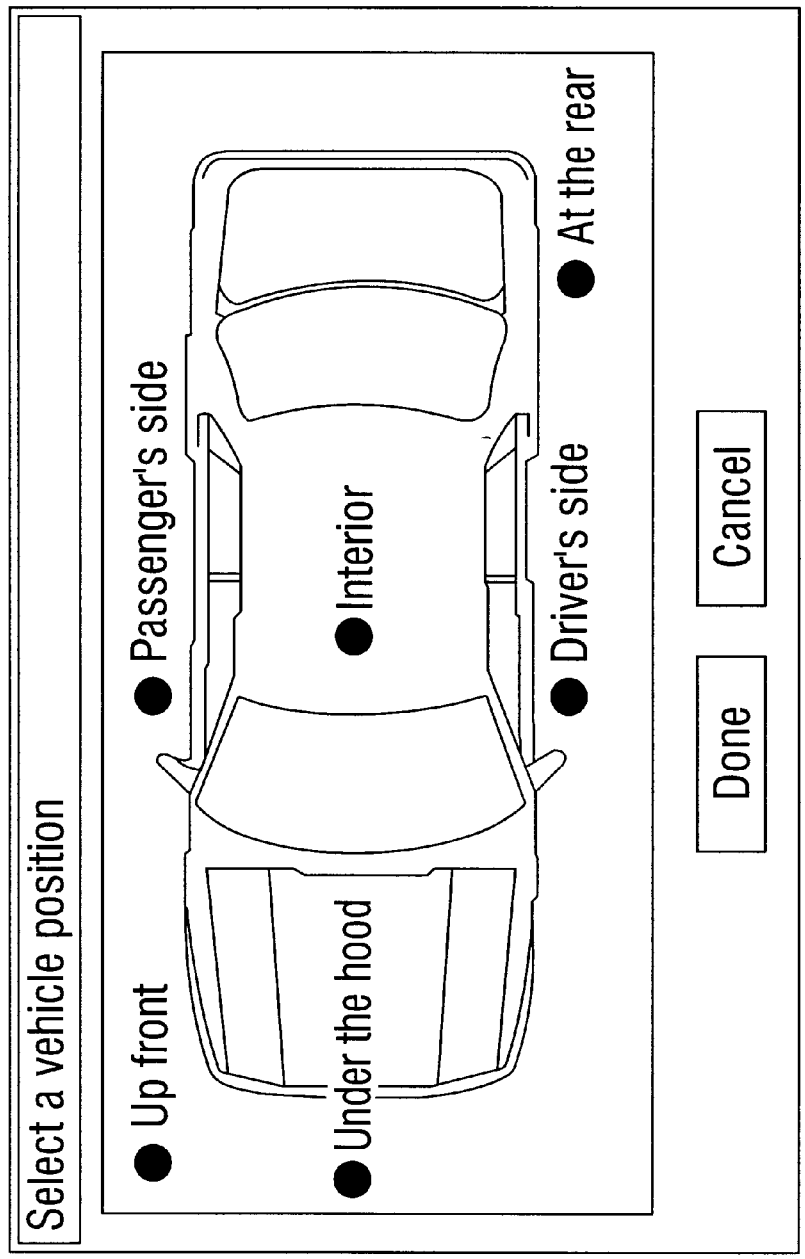
Figure 45:
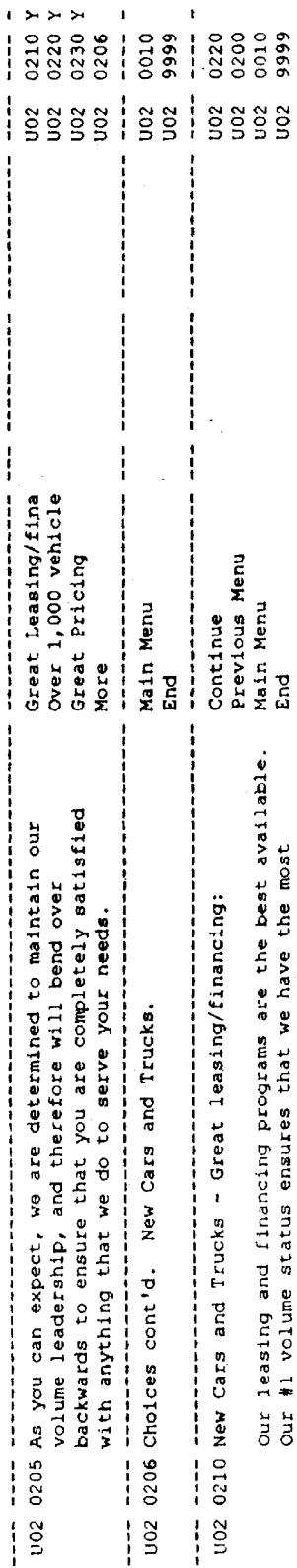
Figure 50:
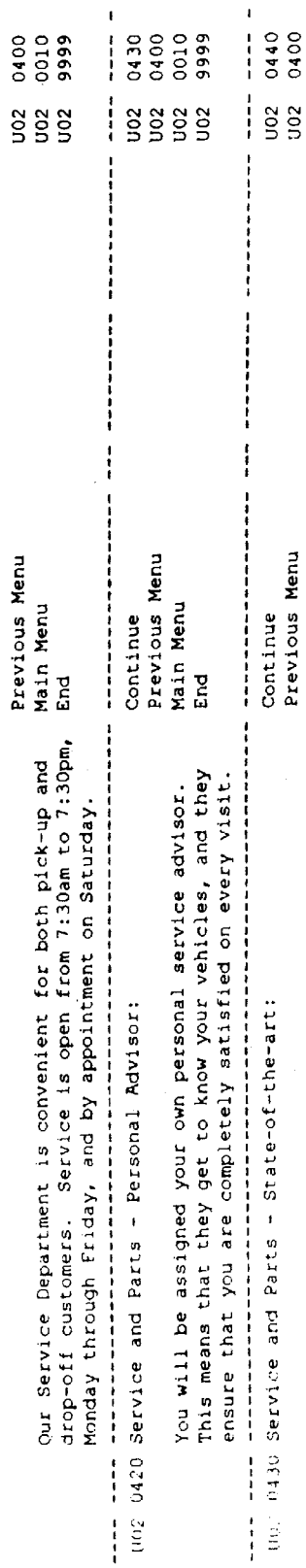
Figure 55:
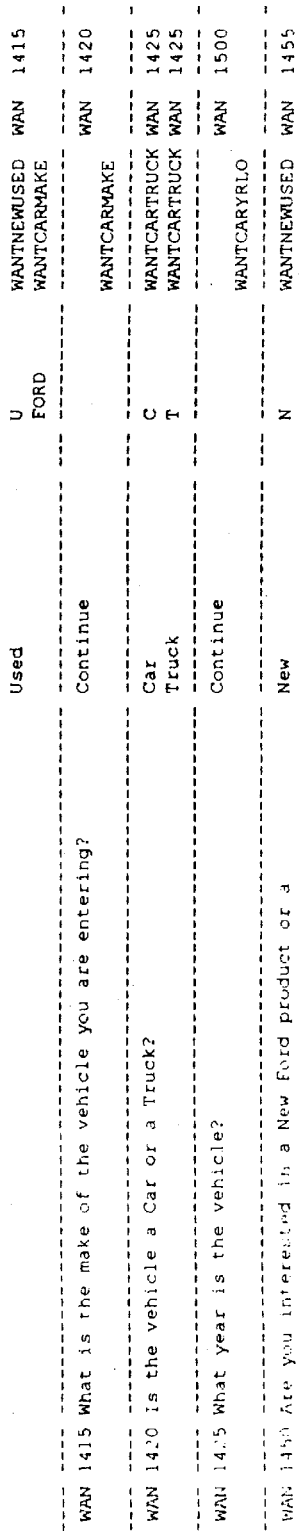
Figure 57:
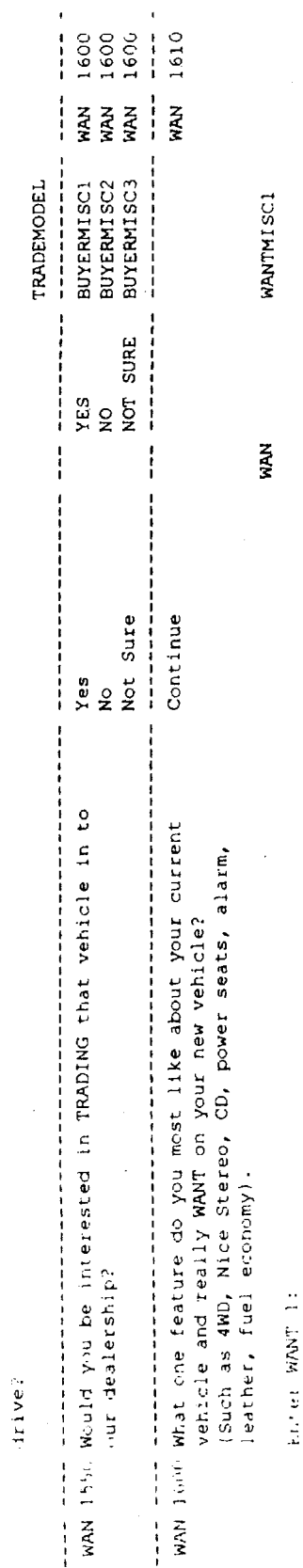
Figure 59:
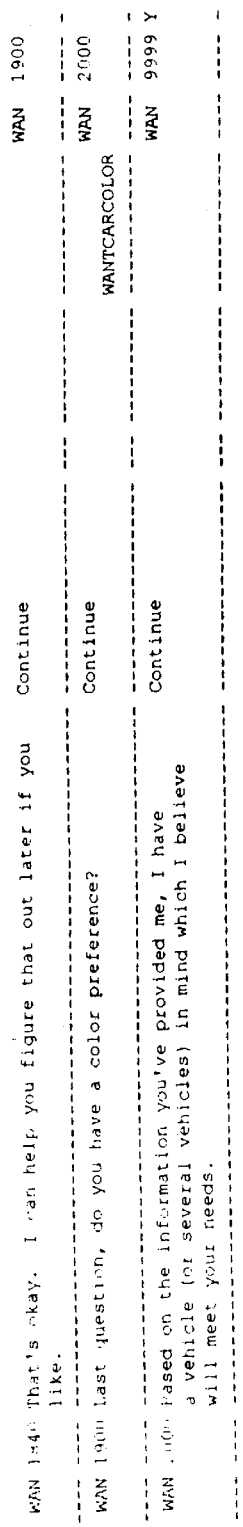
Figure 67:
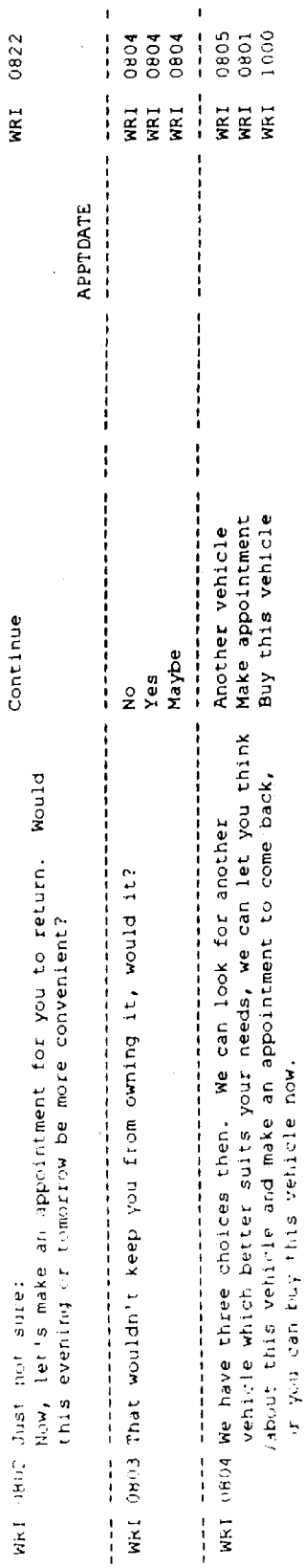

HARDWARE: One possible embodiment of the handheld unit 110 is the Fujitsu Stylistic 1000 RF, shown in FIG. 2 identified by the reference numeral 200/110, running the Microsoft Windows 95 operating system. In implementations involving outdoor sales work (e.g., car dealerships), the available transflective monochrome liquid-crystal display (LCD) option is preferred for the screen 205 for greater visibility in sunlight. This model of the Stylistic 1000 includes an antenna 210 for a spread-spectrum radio; if a different model without a built-in wireless link is used, then a separate unit such as an ARLAN wireless LAN adapter can be inserted into the PCMCIA slot (sometimes called the PC Card slot) on the handheld unit. Data entry can be accomplished with a stylus 215. The unit advantageously includes a hot-swappable battery, permitting the battery to be changed without powering down the unit. At this writing, more detailed information is available at http://www.fpsi.fujitsu.com/products/st10RF.htm.

a) SOFTWARE—SCREEN DISPLAYS, DATA ENTRY: FIGS. 3 through 21 show examples of screen displays and data entry fields. The examples are from an experimental prototype of the invention designed for use in car dealerships. The Figures show fictitious prospect data in the displays. It will be appreciated by those of ordinary skill having the benefit of this disclosure that other screen arrangements are possible and, in other contexts, may be preferable to the ones shown here; for example, an implementation of the invention for use in a jewelry store obviously will be different from the car-dealership illustration shown in the drawings. Which specific screen arrangement to use in a given context is a matter of design choice for the artisan.

As seen in FIGS. 3 through 20, the prototype display- and data-entry screens for a given prospect are conventionally organized by representations of notebook tabs shown at the bottom of each screen. A given screen can be brought up on the display 205 of the handheld unit 110 by clicking with the stylus 215 on the appropriate tab. As is customary for such a display organization, the tab for screens not actually being viewed may be shown in a different color or shading than the tab for the screen being viewed. The specific prototype display/data entry screens shown in the Figures are described in Table 1 below; three-letter codes correspond to the codes at the lower right portion of various (but not all) screens.

TABLE 1

DESCRIPTION OF SELECTED FIGURES

| | | | |
|---|---|---|---|
| FIG. 3 | INF | Prospect info | Basic information about the prospect, e.g., name, address, phone number |
| FIG. 4 | PER | Prospect personal data | More detailed information about the prospect such as Internet address, nickname, hobbies |
| FIG. 5 | COB | Co-buyer data | Information about a co-buyer such as a husband or wife |
| FIG. 6 | WAN | Prospect wants | Details about what the prospect wants in a vehicle |
| FIG. 7 | TRA | Trade-in | Information about the car the prospect wants to trade in |
| FIG. 8 | APP | Trade-in appraisal | Trade-in appraisal information |
| FIG. 9 | SEL | Vehicle search (Attributes and Price/Payment tab) | A form for searching the sales data store to locate vehicles matching specific criteria |
| FIG. 10 | SEL | Vehicle search (Options tab) | A form for searching the sales information data store to locate vehicles matching specific criteria |
| FIG. 11 | | Vehicles found | A list of vehicles found in the sales information data store that match the search criteria, along with detailed information about a highlighted vehicle |
| FIG. 12 | VBH | Selected vehicle | Information about a specific vehicle; includes a "Hold for salesman" button in the lower right corner to place a temporary hold on the vehicle |
| FIG. 13 | CBI | Credit bureau inquiry | Displays information to be sent to a credit bureau. Includes a "Send" button in the lower right corner, which causes a credit inquiry signal to be transmitted. |
| FIG. 14 | OFF | Prospect offer | A screen showing the current status of offers and counteroffers. |
| FIG. 15 | SOL | Sold | Information about a specific vehicle sold to a specific prospect |
| FIG. 16 | DBL | Delivered | Information about a specific vehicle delivered to a specific prospect |
| FIG. 17 | | Select a vehicle position | A graphical touch-screen prompt that brings up script prompts with suggested points for the seller to discuss about the area of the car touched (see FIGS. 18, 19). If the sales information data store contains enough specific information about the various makes and models of vehicles, additional touch-screen prompts can be "nested," e.g., touching the "Interior" region brings up a list (or diagram) of interior features such as air conditioning, cruise control, etc. |
| FIG. 18 | | Speed Control | A sample script prompt; includes three navigation buttons Next, Previous, More. |
| FIG. 19 | | Speed Control | Another sample script prompt. |
| FIG. 20 | BEB | Sales Manager | A screen brought up when the seller wants to close out the prospect record. Data fields marked by an asterisk are the minimum data that the seller should collect and record to be able to return to the main menu. The "beback" date and time fields indicate when the prospect has indicated s/he will return. |
| FIG. 21 | | | An example of a dialog box with a suggested script and three buttons for the seller to choose from. Includes two navigation buttons, Top and Previous, at the top right of the dialog box. |

B) SOFTWARE—SCRIPT BUTTONS: Many of the screens have two rows of "buttons" at the top of the screen (with some buttons grayed out in some of the screens). Clicking on a button in the second row causes the handheld unit 200/110 to begin running a script for the corresponding phase or "step" of the sales presentation process as described in Table 2. An asterisk may be displayed in one of these step-related buttons to indicate that the seller has worked through enough of the script for the step in question that the step can be marked as complete. For example, in FIG. 3, the GRT button screen that is currently being displayed (e.g., the Prospect Info screen shown in FIG. 3).

TABLE 3

SCRIPT CONTENTS

Figure 27:
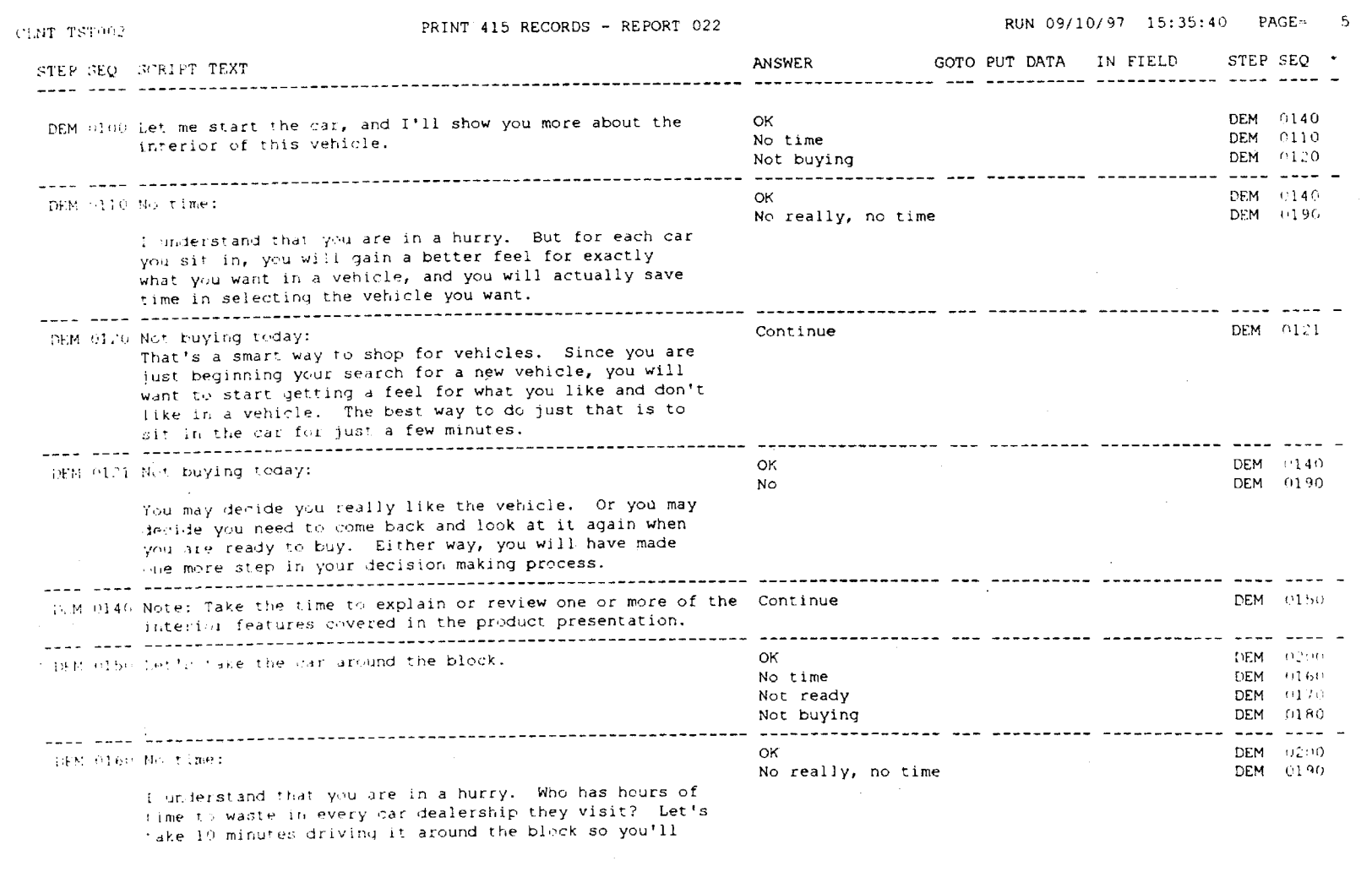

| | |
|---|---|
| SCRIPT TEXT | Text to be displayed in the dialog box to prompt the seller to say specific things to the prospect. For example, in FIG. 27, at the script record labeled DEM 0100, the seller is prompted to say "Let me start the car, and I'll show you more about the interior of this vehicle." |
| ANSWER | The text of zero or more buttons, menu choices, etc., to be displayed as part of the dialog box so that, e.g., the seller can indicate the prospect's response to the SCRIPT TEXT. For example, in FIG. 27, three potential answers are displayed: OK, No time, and Not buying. |
| GOTO | Indicates that, when this script record is executed, a different screen is to be displayed "under" the dialog box. For example, in FIG. 36, script record SEL 0020 contains the entry SEL in the GOTO field. This indicates that when this record is executed by the handheld unit 200/110, the "Vehicle search" screen shown in FIG. 9 (whose three-letter code is SEL) is displayed under the dialog box. |
| PUT DATA, FIELD | Specific data values to be entered in specific fields in the sales-information data store. For example, in FIG. 38, if the seller clicks on the answer indicating that the prospect's trade-in is being financed by FMCC, then the value "FMCC" is assigned ("put") to the field TRADELIENNAM (trade-in lienholder name). |
| STEP, SEQ | The next record of the script to be executed (which can vary depending on which prospect response is selected). For example, in FIG. 27, if the prospect's answer to "Let me start the car . . ." is "OK," then the handheld unit 200/110 executes script record DEM 0140, which suggests that the seller "[t]ake the time to explain or review one or more of the interior features covered in the product presentation." |
| *(asterisk) | Indicates that, when the script record in question is complete, the entire "step" can be marked as complete. For example, in FIG. 36, the "Y" entries in script records SEL 0020, 0030, and 0040 indicate that if any of these three records is executed, the entire Vehicle search step in the sales presentation process, whose three-letter code is SEL, can be marked as complete (see, e.g., the asterisk in the SEL button shown at the top of FIG. 12). | has an asterisk to show that the Greeting step has been sufficiently completed.

The script (reproduced in FIGS. 22 through 70) prompts the user to say certain things to the prospect and to enter certain data at specific points in the sales presentation process; the data entered are displayed on the screens described above. Many but not all of the three-letter codes for the scripts are the same as the three-letter codes for the screens listed in Table 1.

TABLE 2

SCRIPTS IN PROTOTYPE SELLER PROCESS

| | |
|---|---|
| GRT | Greeting the prospect |
| WAN | Determining the prospect's wants |
| SEL | Selecting an actual vehicle |
| PRO | Product presentation (a detailed product-presentation script with prompts for discussion of features found in specific vehicles is in the file SCRIPT.RPT in the microfiche appendix). |
| DEM | Demo of a vehicle |
| TRA | Trade-in |
| SBR | Service department (often user-defined to be specific to the dealership) |
| WRI | Write up the order (offers and counter-offers) |
| SOL | Update the information on the vehicle sold |
| DLR | Dealer-defined, e.g., "why should you buy your car here" information |

The script, shown in FIGS. 22 through 70, can be thought of as a flowchart expressed in words. Each "line" of the script, referred to as a record, contains information as described in Table 3 below. Execution of the script by the handheld unit 200/110 causes a dialog box (see, e.g., the "Welcome to ABC Motors. How may I assist you today" dialog box shown in FIG. 21) to be displayed "over" the c) SOFTWARE—OTHER BUTTONS: Referring to FIG. 3 as an example, the top row of buttons includes the buttons Show Script; Close Prosp[ect], and Manager. The Show Script button causes the handheld unit 110 to resume running a script that was suspended by the seller (using a Hide Script button, not shown). The Close Prosp[ect] button signifies that the sales presentation has ended, either with or without a sale. The Manager button causes a signal to sent to summon a sales manager as described in Section 4.5(r) above.

d) SOURCE CODE: It will be appreciated by those of ordinary skill having the benefit of this disclosure that much more detail about the operation of the prototype can be found in the source code reproduced in the microfiche source code appendix. The code is written to be compiled with the Microsoft® Visual C++ compiler.

Other Remarks

Use of the system described above helps management enforce the desired standardization of the sales process. The seller cannot advance through the prescribed sales process until he or she has completed all prior steps. In this way, management is assured that each prospect receives the treatment that has been deemed most effective in making a sale.

For example, the handheld unit 110 ordinarily allows the seller to retrieve and view sales information from the sales information data store for the benefit of the prospect (e.g., to determine whether a particular model is in stock). However, if the seller has not recorded the prospect's personal information such as name, address, and telephone number, the system will not allow the seller to retrieve that information. Thus, unless the seller follows the prescribed program, he or she is effectively prevented from proceeding. However, if the seller progresses through the prescribed steps, the handheld unit 110 may inform the sales management of each step completed successfully. In this way, management keeps abreast of which transactions have been dragging in critical stages, when management assistance might be useful.

The system provides other benefits besides adherence to the sales process. New sellers are easily trained on the job: once they learn to use the sales machine, it gives them a step-by-step script to follow, taking the guesswork out of the learning process.

Sellers are prompted through a thorough product presentation of features and benefits. These product presentations are specific to the product that the prospect desired to purchase and are tailored to address both the general and specific interests of the prospect.

Also, management now has an accurate picture of each seller's sales efficiency (ratio between number of sales completed per number of prospects seen). In a paper based system, sellers had a disincentive to record the visits of prospects who made no purchase, so management did not get any real idea of how well each seller was performing.

Program Storage Device

As noted above, any of the foregoing variations may be implemented by programming a suitable general-purpose computer having appropriate hardware such as a microprocessor, memory, and a communications device such as a modem (preferably wireless for the handheld device 110). The programming may be accomplished through the use of a program storage device readable by the computer and encoding a program of instructions executable by the computer for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here.

It will be apparent to those of ordinary skill having the benefit of this disclosure that numerous variations are possible from the illustrative embodiments described above. Accordingly, it is the claims below and not the illustrative embodiments that measure the exclusive rights claimed in the invention.

What is claimed is:

1. A sales support computer comprising:
   (a) means operable by a seller for recording prospect data about a prospect, including information about at least one particular interest of the prospect; and
   (b) means for displaying a series of prompts to the seller, as a function of the prospect data, to prompt the seller to perform steps in a desired sales communication process during an encounter with the prospect in response to the at least one particular interest of the prospect, including one or more prompts to the seller to describe orally to the prospect one or more specific features and benefits of a product or service.

2. The sales support computer of claim 1 wherein the sales support computer is of a size suitable for the computer to be held in the seller's hand.

3. The sales support computer of claim 1 wherein the particular interest is selected from the group consisting of safety, economy, performance, style, trailing towing capacity, side airbags, and anti-lock braking.

4. The sales support computer of claim 1 wherein the information about at least one particular interest of the prospect includes information about the composition of the prospect's family.

5. The sales support computer of claim 1, wherein the prompting to perform specified sequence of steps includes prompting the seller to say specific prospect-related information aloud.

6. The sales support computer of claim 5, wherein the specific prospect-related information comprises the prospect's name.

7. The sales support computer of claim 5, wherein the specific prospect-related information comprises information about a product option in which the prospect has indicated an interest.

8. The sales support computer of claim 5, wherein the specific prospect-related information comprises a recap list of information about product options in which the prospect has indicated an interest.

9. The sales support computer of claim 1, further comprising:
   c) means for prompting the seller with a script of product features and benefits.

10. The sales support computer of claim 1, further comprising:
    c) means for displaying a list of options available for a specific product.

11. The sales support computer of claim 1, further comprising:
    c) means for simultaneously displaying information about the availability of one or more specified options for two or more specific products.

12. The sales support computer of claim 1, further comprising:
    c) means for displaying a table of option availability for two or more specific products.

13. The sales support computer of claim 1, further comprising:
    c) means for summoning assistance for the seller.

14. The sales support computer of claim 1, further comprising:
    c) means for retrieving information from an external data store.

15. The sales support computer of claim 14, wherein the retrieved information comprises consumer credit information.

16. The sales support computer of claim 1, further comprising:
    c) means for retrieving and displaying sales information from a sales information data store; and
    d) means for preventing the seller from perceiving sales information from the sales information data store unless the seller records the prospect data.

17. The sales support computer of claim 1, further comprising:
    c) means for retrieving and displaying sales information from a sales information data store; and
    d) means for preventing the seller from perceiving sales information from the sales information data store if the seller does not comply with the desired sales communication process.

18. The sales support computer of claim 1, further comprising:
    c) means for accessing an external data store, and
    d) means for preventing the seller from retrieving information from the external data store if the seller does not comply with the desired sales communication process.

19. The sales support computer of claim 1, further comprising:
  c) means for recording the duration of performance of respective steps in the desired sale communication process.

20. The sales support computer of claim 19, wherein the means for recording the duration of performance of respective steps in the desired sales communication process comprises means for recording time stamps identifying the respective times of performance of the steps.

21. The sales support computer of claim 1, further comprising:
  c) means for transmitting a creditworthiness inquiry about the prospect to a financial institution, and
  d) means for receiving a creditworthiness report on the prospect.

22. The sales support computer of claim 21, further comprising:
  e) means for recording a representation of the prospect's signature, and
  f) transmitting a representation of the prospect's signature to the financial institution.

23. The sales support computer of claim 1, further comprising:
  c) means for transmitting a sales offer and means for receiving a response to the offer.

24. The sales support computer of claim 1, further comprising:
  c) means for locally storing at least a portion of a sales information data store; and
  d) means for periodically updating said locally-stored portion.

25. A sales support computer comprising:
  a) means operable by a seller for recording prospect data about a prospect, including information about at least one particular interest of the prospect;
  b) means for prompting the seller to perform a specified sequence of operations in a desired sales communication process during a meeting with the prospect, said operations including (1) recording prospect data, and (2) telling the prospect about a product option correlated with the prospect's particular interest; and
  c) means for restricting the seller's ability to use the sales support computer if the seller does not perform the specified sequence of operations.

26. The sales support computer of claim 25, wherein the particular interest is selected from the group consisting of safety, economy, performance, style, trailing towing capacity, side airbags, and anti-lock braking.

27. The sales support computer of claim 25, wherein the information about at least one particular interest of the prospect includes information about the composition of the prospect's family.

28. A sales support computer comprising:
  a) means operable by a seller for recording prospect data about a prospect, including information about at least one particular interest of the prospect;
  b) means for querying a sales information data store to determine the availability of specific products having one or more features correlated with the prospect's particular interest;
  c) means for prompting the seller to perform a specified sequence of operations in a desired sales communication process during a meeting with the prospect, said operations including:
    (1) recording prospect data, and
    (2) telling the prospect about one or more features that are correlated with the prospect's particular interest; and
  d) means for restricting the seller's ability to use the sales support computer if the seller does not perform the specified sequence of operations.

29. The sales support computer of claim 28, wherein the particular interest is selected from the group consisting of safety, economy, performance, style, trailing towing capacity, side airbags, and anti-lock braking.

30. The sales support computer of claim 28, wherein the information about at least one particular interest of the prospect includes information about the composition of the prospect's family.

31. A sales support computer comprising:
  a) means operable by a seller for recording prospect data about a prospect, including information about at least one particular interest of the prospect;
  b) means for querying a sales information data store to determine the availability of specific products having one or more features correlated with the prospect's particular interest;
  c) means for prompting the seller to perform a specified sequence of operations in a desired sales communication process during a meeting with the prospect, said operations including recording prospect data:
  d) means for recording the duration of performance of respective operations in the desired sales communication process; and
  e) means for restricting the seller's ability to use the sales support computer if the seller does not perform the specified sequence of operations.

32. The sales support computer of claim 31, wherein the particular interest is selected from the group consisting of safety, economy, performance, style, trailing towing capacity, side airbags, and anti-lock braking.

33. The sales support computer of claim 31, wherein the information about at least one particular interest of the prospect includes information about the composition of the prospect's family.

34. A sales support computer comprising:
  a) means operable by a seller for recording prospect data about a prospect, including information about at least one particular interest of the prospect;
  b) means for querying a credit information data store to get an indication of the prospect's creditworthiness;
  c) means for prompting the seller to perform a specified sequence of operations in a desired sales communication process during a meeting with the prospect, said operations including (1) recording prospect data and (2) telling the prospect about one or more product features suggested by one or more particular interests of the prospect; and
  d) means for restricting the seller's ability to use the sales support computer if the seller does not perform the specified sequence of operations.

35. The sales support computer of claim 34, wherein the particular interest is selected from the group consisting of safety, economy, performance, style, trailing towing capacity, side airbags, and anti-lock braking.

36. The sales support computer of claim 34, wherein the information about at least one particular interest of the prospect includes information about the composition of the prospect's family.

37. A sales support computer comprising:
a) means operable by a seller for recording prospect data about a prospect, including information about at least one particular interest of the prospect;
b) means for querying a credit information data store to get an indication of the prospect's creditworthiness;
c) means for querying a sales information data store to determine the availability of specific products having one or more features correlated with one or more particular interests of the prospect;
d) means for prompting the seller to perform a specified sequence of operations in a desired sales communication process during a meeting with the prospect, said operations including (1) recording prospect data and (2) telling the prospect about at least one of said one or more features; and
e) means for restricting the seller's ability to use the sales support computer if the seller does not perform the specified sequence of operations.

38. The sales support computer of claim 37, wherein the particular interest is selected from the group consisting of safety, economy, performance, style, trailing towing capacity, side airbags, and anti-lock braking.

39. The sales support computer of claim 37, wherein the information about at least one particular interest of the prospect includes information about the composition of the prospect's family.

40. The sales support computer of claim 37, further comprising means for summoning assistance for the seller.

41. A sales support computer comprising:
a) means operable by a seller for recording prospect data about a prospect, including information about at least one particular interest of the prospect;
b) means for querying a credit information data store to get an indication of the prospect's creditworthiness;
c) means for querying a sales information data store to determine the availability of specific products having one or more features correlated with one or more particular interests of the prospect;
d) means for prompting the seller to perform a specified sequence of operations in a desired sales communication process during a meeting with the prospect, said operations including recording prospect data;
e) means for restricting the seller's ability to use the sales support computer if the seller does not perform the specified sequence of operations; and
f) means for summoning assistance for the seller.

42. The sales support computer of claim 41, wherein the particular interest is selected from the group consisting of safety, economy, performance, style, trailing towing capacity, side airbags, and anti-lock braking.

43. The sales support computer of claim 41, wherein the information about at least one particular interest of the prospect includes information about the composition of the prospect's family.

44. A sales support computer comprising:
a) means for locally storing a copy of at least a portion of a sales information data store external to the sales support computer;
b) means operable by a seller for recording prospect data about a prospect, including information about at least one particular interest of the prospect;
c) means for querying a credit information data store to get an indication of the prospect's creditworthiness;
d) means for querying said sales information data store to determine the availability of specific products having one or more features correlated with one or more particular interests of the prospect, including determining whether a communications link exists with the sales information data store, and if so, querying the sales information data store, otherwise querying said locally-stored copy;
e) means for prompting the seller to perform a specified sequence of operations in a desired sales communication process during a meeting with the prospect, said operations including (1) recording prospect data and (2) telling the prospect about at least one of said one or more features;
f) means for recording the duration of performance of respective operations in the desired sales communication process;
g) means for restricting the seller's ability to use the sales support computer if the seller does not perform the specified sequence of operations; and
h) means for summoning assistance for the seller.

45. A sales support computer comprising:
a) means for locally storing a copy of at least a portion of a sales information data store external to the sales support computer;
b) means for periodically updating said locally-stored copy;
c) means operable by a seller for recording prospect data about a prospect, including information about at least one particular interest of the prospect;
d) means for querying a credit information data store to get an indication of the prospect's creditworthiness;
e) means for determining the availability of specific products having one or more features correlated with one or more particular interests of the prospect, including determining whether a communications link exists with the sales information data store, and if so, querying the sales information data store, otherwise querying said locally-stored copy;
f) means for prompting the seller to perform a specified sequence of operations in a desired sales communication process during a meeting with the prospect, said operations including (1) recording prospect data and (2) telling the prospect about at least one of said one or more features;
g) means for recording the duration of performance of respective operations in the desired sales communication process;
h) means for restricting the seller's ability to use the sales support computer if the seller does not perform the specified sequence of operations; and
i) means for summoning assistance for the seller.

46. A sales support computer comprising:
a) a processor;
b) a pen-based user interface;
c) a wireless communications interface;
d) a data store;
e) a program store containing programming executable by the processor for carrying out operations including:
1) downloading, via the wireless communications interface into the data store, a copy of at least a portion of a sales information data store external to the sales support computer;
2) receiving, via the pen-based user interface, data inputted by a seller about a prospect, referred to as prospect data, including information about at least one particular interest of the prospect;

3) querying said sales information data store to determine the availability of specific products having one or more features correlated with one or more particular interests of the prospect, including determining whether a communications link exists with the sales information data store, and if so, querying the sales information data store via the wireless communications interface, otherwise querying said locally-stored copy;

4) prompting the seller to perform a specified sequence of operations in a desired sales communication process during a meeting with the prospect; and 5) restricting the seller's ability to use the sales support computer if the seller does not perform the specified sequence of operations.

47. A portable sales support computer comprising:

a) a processor;

b) a pen-based user interface;

c) a wireless communications interface;

d) a data store;

e) a program store containing programming executable by the processor for carrying out operations including:

1) downloading, via the wireless communications interface into the data store, a copy of at least a portion of a sales information data store external to the sales support computer;

2) receiving, via the pen-based user interface, data inputted by a seller about a prospect, referred to as prospect data, including information about at least one particular interest of the prospect;

3) querying a credit information data store via the wireless communications interface to get an indication of the prospect's creditworthiness;

4) querying said sales information data store to determine the availability of specific products having one or more features correlated with one or more particular interests of the prospect, including determining whether a communications link exists with the sales information data store, and if so, querying the sales information data store via the wireless communications interface, otherwise querying said locally-stored copy;

5) prompting the seller to perform a specified sequence of operations in a desired sales communication process during a meeting with the prospect, said operations including (1) inputting prospect data and (2) telling the prospect about at least one of said one or more features;

6) recording the duration of performance of respective operations in the desired sales communication process;

7) restricting the seller's ability to use the sales support computer if the seller does not perform the specified sequence of operations; and 8) in response to a command inputted by the seller, transmitting via the wireless communications interface a signal summoning assistance for the seller.

* * * * *